(12) United States Patent
Sato

(10) Patent No.: US 7,405,526 B2
(45) Date of Patent: *Jul. 29, 2008

(54) CONTROL APPARATUS AND CONTROL METHOD FOR VOLTAGE CONVERSION APPARATUS

(75) Inventor: Eiji Sato, Aichi-ken (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/783,547

(22) Filed: Apr. 10, 2007

(65) Prior Publication Data

US 2007/0195568 A1    Aug. 23, 2007

Related U.S. Application Data

(63) Continuation of application No. PCT/JP2005/018716, filed on Oct. 4, 2005.

(30) Foreign Application Priority Data

Oct. 15, 2004   (JP)   ............... 2004-301662

(51) Int. Cl.
   *H02M 3/18*   (2006.01)
(52) U.S. Cl. .................. 318/139; 320/140; 363/74; 363/80
(58) Field of Classification Search ........... 363/72, 363/76, 80, 81, 89, 37, 65, 124; 318/139, 318/806, 812, 375; 320/140, 149

See application file for complete search history.

(56) References Cited

U.S. PATENT DOCUMENTS

| 2004/0095118 A1 | 5/2004 | Kernahan |
| 2005/0067999 A1 | 3/2005 | Okamura et al. |
| 2006/0156096 A1 | 7/2006 | Sato |
| 2007/0029954 A1 | 2/2007 | Okamura et al. |

FOREIGN PATENT DOCUMENTS

| CA | 2 470 934 A1 | | 7/2003 |
| JP | 2004-112904 A | | 4/2004 |
| WO | WO 03/061104 | * | 7/2003 |
| WO | WO 03/061104 A1 | | 7/2003 |
| WO | WO 2004/064235 A2 | | 7/2004 |

* cited by examiner

*Primary Examiner*—Rajnikant B Patel
(74) *Attorney, Agent, or Firm*—Kenyon & Kenyon LLP

(57) ABSTRACT

The SOC of a battery is calculated based on the voltage Vb and current Ib of a battery, and a battery electromotive voltage Vbo is calculated based on the SOC of the battery. Based on the battery electromotive voltage Vbo and the voltage Vc of a capacitor connected on the output side of the DC/DC converter, a duty ratio $D(=Vbo/2Vc)$ achieving the maximum battery power is set as the lower limit value DL of the optimum duty range DR, so that the lower limit value DL is varied according to the SOC of the battery. The duty ratio D is limited so as to fall within the optimum duty range DR, and the DC/DC converter is controlled to be driven using the limited duty ratio D.

18 Claims, 14 Drawing Sheets

(a)

(b)

CONTROL APPARATUS AND CONTROL METHOD FOR VOLTAGE CONVERSION APPARATUS

RELATED APPLICATIONS

This is a continuation of PCT/JP2005/018716 filed on 4 Oct. 2005, claiming priority to Japanese Application No. 2004-301662 filed on 15 Oct. 2004, the contents of which are incorporated herein by reference.

TECHNICAL FIELD

The present invention relates to a control apparatus and a control method for a voltage conversion apparatus, and in particular to a control apparatus and a control method for a voltage conversion apparatus capable of controlling a voltage conversion ratio by adjusting the duty ratio of a switching control signal to be supplied to a switching element.

BACKGROUND ART

As a conventional driving system having a voltage conversion apparatus, there is proposed a system comprising, for example, a battery which serves as a power source of the driving system, a DC/DC converter for performing DC/DC conversion to an input voltage from the battery, a load comprising an inverter circuit for converting an output from the DC/DC converter into multi-phase AC electrical power and a motor for rotation driving while receiving the multi-phase AC electrical power from the inverter circuit, and a capacitor arranged between the DC/DC converter and the load and connected to the positive and negative bus bars (lines) of the inverter circuit (for example, Japanese Patent Laid-open Publication No. 2004-112904).

In this system, an input voltage from the battery is subjected to DC/DC conversion by the DC/DC converter, and thereafter stored in the capacitor, so that a load is driven using the power-storing capacitor which is then considered as a DC power source. Also, the voltage conversion ratio of the DC/DC converter can be controlled by adjusting the duty ratio of a switching control signal to be output to a switching element within the DC/DC converter.

Also, International Publication No. 03/61104 discloses a control apparatus of a voltage conversion apparatus.

For the reasons described below, such a system requires control to limit the voltage conversion ratio of the DC/DC converter by limiting the duty ratio of a switching control signal. Generally, a typical battery is designed capable of supplying electrical power of an amount corresponding to load requiring power. Depending on the condition of a battery, however, a battery may not be able to output electrical power of an amount corresponding to the load requiring power, for example, when the internal resistance of a battery increases due to drop of temperature.

In this case, should a DC/DC converter be simply controlled to be driven such that electrical power of an amount corresponding to the load requiring power is fed to the load, an increased amount of electrical power may be consumed due to the inner resistance of the battery and, consequently, only a reduced amount of electrical power can be supplied to the load. In order to suppress drop in the electrical power supplied to the load, the duty ratio of a switching control signal requires limitation.

According to the international publication No. 03/61104, the control apparatus of the voltage conversion apparatus sets the duty ratio which leads to the maximum battery power as a lower limit of the optimum duty range, based on the electromotive voltage (which is set as a constant) of a battery and an output voltage of a DC/DC converter, and the duty ratio of a switching control signal to be supplied to the switching element is limited so as to remain within the optimum duty range. That is, the related control apparatus of the voltage conversion apparatus limits the duty ratio to thereby suppress drop of electrical power supplied to the load.

In this related art, however, as the electromotive voltage of a battery is set as a constant, when an electromotive voltage varies due to variation in the state of charge (SOC) of the battery, the lower limit of the optimum duty range may also undesirably vary due to variation in the state of charge (SOC) of the battery. This makes it difficult to perform optimum control to limit the voltage conversion ratio of the DC/DC converter.

The present invention can advantageously provide a control apparatus and a control method for a voltage conversion apparatus capable of performing more appropriate control to limit the voltage conversion ratio of the voltage conversion apparatus.

DISCLOSURE OF INVENTION

According to one aspect of the present invention, there is provided a control apparatus for use in a voltage conversion apparatus which converts, to output, a DC voltage supplied from a chargeable and dischargeable storage battery into a desired voltage through switching operation of a switching element, the control apparatus capable of controlling a voltage conversion ratio by adjusting a duty ratio of a switching control signal to be supplied to the switching element, comprising:

an acceptable range setting unit for setting the acceptable range of the duty ratio of a switching control signal based on power characteristics of the storage battery relative to the duty ratio;

a duty ratio limit unit for limiting the duty ratio of the switching control signal such that the duty ratio falls in the acceptable range; and a state of charge acquiring unit for acquiring information on a state of charge of the storage battery, wherein the acceptable range setting unit changes the acceptable range relative to variation of the state of charge of the storage battery.

According to another aspect of the present invention, there is provided a control apparatus for use in a voltage conversion apparatus which converts, to output, a DC voltage supplied from a chargeable and dischargeable storage battery into a desired voltage through switching operation of a switching element, the control apparatus capable of controlling a voltage conversion ratio by adjusting a duty ratio of a switching control signal to be supplied to the switching element, comprising:

an acceptable range setting unit for setting an acceptable range of the duty ratio of a switching signal such that a current of the storage battery falls within a predetermined range;

a duty ratio limit unit for limiting the duty ratio of the switching control signal such that the duty ratio falls in the acceptable range; and a state of charge acquiring unit for acquiring information on a state of charge of the storage battery, wherein the acceptable range setting unit changes the acceptable range relative to variation of the state of charge of the storage battery.

According to still another aspect of the present invention, there is provided a control apparatus for use in a voltage conversion apparatus which converts, to output, a DC voltage supplied from a chargeable and dischargeable storage battery into a desired voltage through switching operation of a switching element, the control apparatus capable of controlling a voltage conversion ratio by adjusting a duty ratio of a switching control signal to be supplied to the switching element, comprising:

a current detection unit for detecting a current of the storage battery;

an acceptable range setting unit for setting an acceptable range of the current of the storage battery based on power characteristics for the current of the storage battery;

a duty ratio limit unit for limiting the duty ratio of the switching control signal such that the current of the storage battery falls in the acceptable range; and a state of charge acquiring unit for acquiring information about a state of charge of the storage battery, wherein the acceptable range setting unit changes the acceptable range relative to variation in the state of charge of the storage battery.

According to yet another aspect of the present invention, there is provided a control apparatus for use in a voltage conversion apparatus which converts, to output, a DC voltage supplied from a chargeable and dischargeable storage battery into a desired voltage through switching operation of a switching element, the control apparatus capable of controlling a voltage conversion ratio by adjusting a duty ratio of a switching control signal to be supplied to the switching element, comprising:

a voltage detection unit for detecting a voltage of the storage battery;

a duty ratio limit unit for limiting the duty ratio of the switching control signal such that the voltage of the storage battery falls in the acceptable range;

a state of charge acquiring unit for acquiring information about a state of charge of the storage battery; and an acceptable range setting unit for changing the acceptable range relative to variation in the state of charge of the storage battery.

According to yet another aspect of the present invention, there is provided a control method for use by a voltage conversion apparatus which converts, to output, a DC voltage supplied from a chargeable and dischargeable storage battery into a desired voltage through switching operation of a switching element, the control method capable of controlling a voltage conversion ratio by adjusting a duty ratio of a switching control signal to be supplied to the switching element, comprising:

acquiring information about a state of charge of the storage battery;

setting the acceptable range of the duty ratio of a switching control signal based on power characteristics of the storage battery relative to the duty ratio of a switching control signal while changing the acceptable range of the duty ratio of the switching control signal relative to variation in the state of charge of the storage battery; and limiting the duty ratio of the switching control signal such that the duty ratio falls in the acceptable range.

According to yet another aspect of the present invention, there is provided a control method for use by a voltage conversion apparatus which converts, to output, a DC voltage supplied from a chargeable and dischargeable storage battery into a desired voltage through switching operation of a switching element, the control method capable of controlling a voltage conversion ratio by adjusting a duty ratio of a switching control signal to be supplied to the switching element, comprising:

acquiring information about a state of charge of the storage battery;

setting an acceptable range of the duty ratio of the switching control signal such that a current of the storage battery falls in a predetermined setting range while changing the acceptable range of the duty ratio of the switching control signal relative to variation in the state of charge of the storage battery; and limiting the duty ratio of the switching control signal such that the duty ratio falls in the acceptable range.

According to yet another aspect of the present invention, there is provided a control method for use by a voltage conversion apparatus which converts, to output, a DC voltage supplied from a chargeable and dischargeable storage battery into a desired voltage through switching operation of a switching element, the control method capable of controlling a voltage conversion ratio by adjusting a duty ratio of a switching control signal to be supplied to the switching element, comprising:

detecting a current of a storage battery;

acquiring information about a state of charge of the storage battery;

setting an acceptable range of the current of the storage battery based on power characteristics relative to the current of the storage battery while changing the acceptable range of the current of the storage battery relative to variation in the state of charge of the storage battery; and limiting the duty ratio of the switching control signal such that the current of the storage battery falls in the acceptable range.

According to yet another aspect of the present invention, there is provided control method for use by a voltage conversion apparatus which converts, to output, a DC voltage supplied from a chargeable and dischargeable storage battery into a desired voltage through switching operation of a switching element, the control method capable of controlling a voltage conversion ratio by adjusting a duty ratio of a switching control signal to be supplied to the switching element, comprising:

detecting a voltage of the storage battery;

acquiring information about a state of charge of the storage battery;

changing an acceptable range of the voltage of the storage battery relative to variation in the state of charge of the storage battery; and limiting the duty ratio of the switching control signal such that the voltage of the storage battery falls in the acceptable range.

According to the present invention, control for limiting the voltage conversion ratio of a voltage conversion apparatus by limiting the duty ratio of a switching control signal to be supplied to a switching element can be more appropriately performed.

BEST MODE FOR CARRYING OUT THE INVENTION

Preferred embodiments of the present invention will be described.

Figure 1:
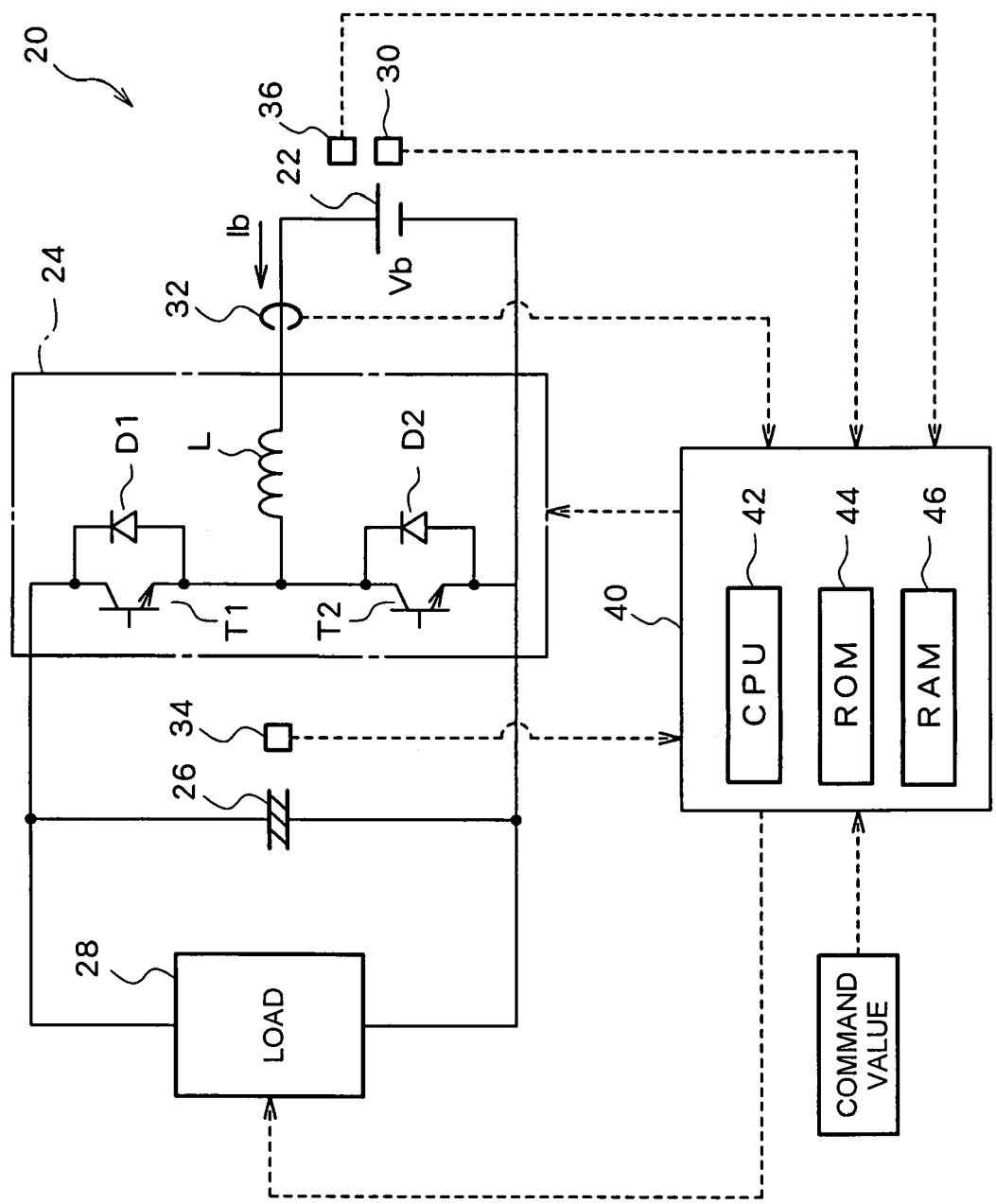
FIG. 1 is a schematic diagram showing a structure of a driving system 20 in one embodiment of the present invention.

FIG. 1 is a schematic diagram showing a structure of a driving system 20 having a control apparatus for a voltage conversion apparatus in an embodiment of the present invention. The driving system 20 in the embodiment comprises, as shown, a battery 22 to serve as a chargeable and dischargeable storage battery, a DC/DC converter 24 to serve as a voltage conversion apparatus for performing DC/DC conversion on an input voltage from the battery 22 and output a result, a capacitor 26 capable of storing electrical power output from the DC/DC converter 24, a load 28 capable of being driven using electrical power stored in the capacitor 26, and an electronic control unit 40 for controlling the entire apparatus.

The battery 22 may be prepared, for example, in the form of a secondary battery of lead or lithium (Li) ion. The battery 22 mentioned here has a characteristic such that an electromotive voltage Vbo varies relative to variation in an SOC (state of charge), shown in FIG. 2, for example. More specifically, the electromotive voltage Vbo increases as the SOC increases, or varies toward the full state of charge.

The DC/DC converter 24 comprises two serially connected transistors T1, T2, two diodes D1, D2, and a reactance L. The two transistors T1, T2 are respectively connected to the positive and negative lines and on the source and sink sides of the load 28. The two diodes D1, D2 are reverse parallel connected to the transistors T1, T2, respectively, and the reactance L is connected, at one end, to one end of the battery 22, and at the other end to a point at which connecting the transistors T1, T2.

The transistor T1 is arranged between the other end of the reactance L and an output terminal of the DC/DC converter 24, while the transistor T2 is connected between the other end of the reactance L and the other end of the battery 22.

In the DC/DC converter 24, when the transistor T2 is turned on, a short circuit is formed which connects the battery 22, the reactance L, and the transistor T2, so that energy complying with the DC current from the battery 22 is stored in the reactor L. When the transistor T2 is then turned off, the energy stored in the reactance L is then stored in the capacitor 26 via the diode D1. In the above, the voltage of the capacitor 26 can become higher than a voltage fed by the battery 22.

In this DC/DC converter 24, it is also possible to charge the battery 22 using the charge stored in the capacitor 26. In this sense, the DC/DC converter 24 constitutes an elevating/descending voltage chopper circuit which can charge the capacitor 26 by turning the transistors T1, T2 on/off, and can further charge the battery 22 using the charge stored in the capacitor 26. The reactor of the DC/DC converter 24 may employ a coil.

Figure 3:
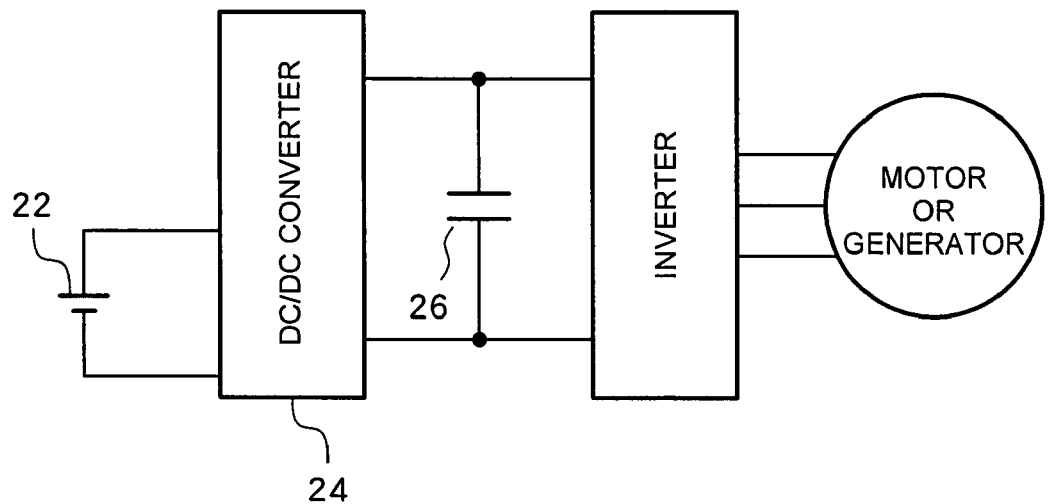
FIG. 3 is a diagram showing an example of a driving system 20.
Figure 3:
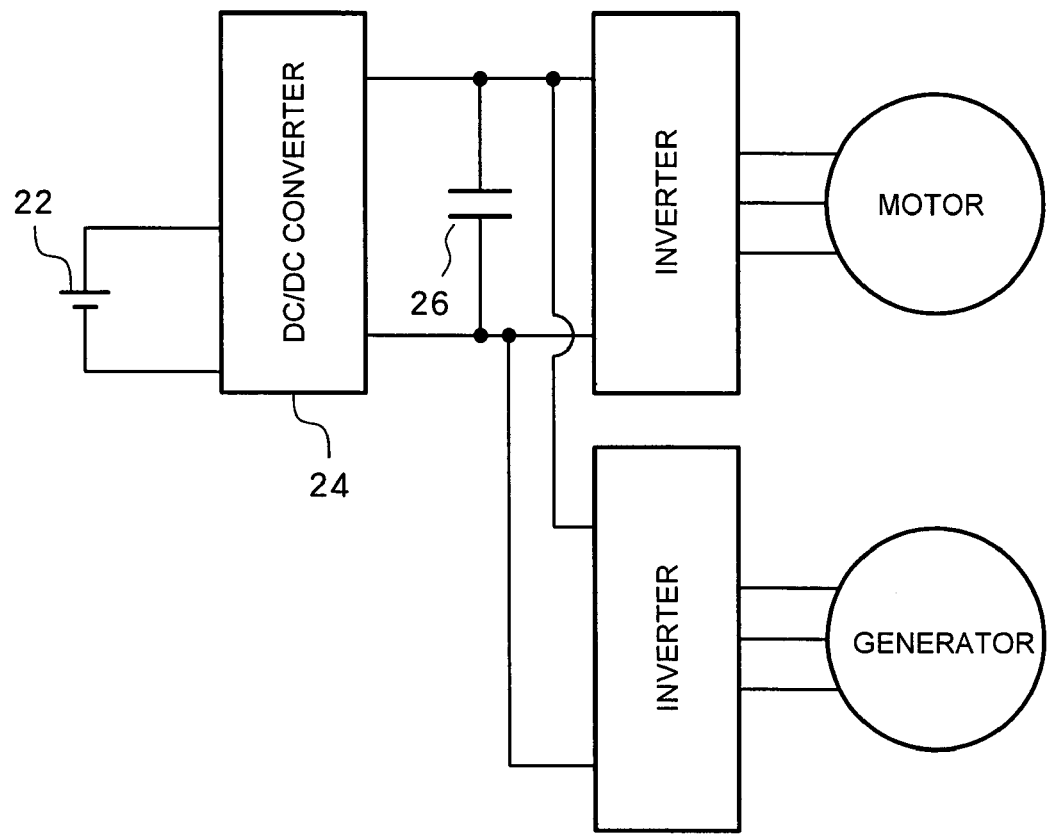

The load 28 may have a structure, as shown in FIG. 3, for example, which comprises an inverter and a motor or generator such as is mounted in an electric and/or hybrid vehicle (see FIG. 3(a)) or a structure which comprises two parallel connected inverters respectively connected to a motor and a generator (see FIG. 3(b)), though a motor or generator such as is mounted in an electric or hybrid vehicle is not an exclusive example and any electric device which is driven using power from the battery 22 is also applicable.

The electronic control unit 40 is constructed in the form of a micro-processor having, as shown in FIG. 1, a CPU 42 as a main component, a ROM 44 for storing a process program, a RAM 46 for temporally storing data, and input/output ports (not shown). The electronic control unit 40 receives, via input ports, a battery (inter-terminal) voltage Vb from a voltage sensor 30 fitted to the battery 22, a battery current Ib from a current sensor 32 fitted to a power line connecting the battery 22 and the DC/DC converter 24, a capacitor voltage (output voltage of DC/DC converter 24) Vc from a voltage sensor 34 fitted to the capacitor 26, battery temperature Tb from a temperature sensor 36 fitted to the battery 22, and a command value concerning driving of the load 28. Meanwhile, the electronic control unit 40 outputs, via output ports, a switching control signal to the transistors T1, T2 of the DC/DC converter 24 and a driving control signal to the load 28.

Here, the electronic control unit 40 can control the voltage conversion ratio of the DC/DC converter 24 by adjusting the duty ratio D of a switching control signal to be supplied to the transistors T1, T2. In this embodiment, the duty ratio D, which is a ratio between the on period (T1on) of the upper transistor T1 and the on period (T2on) of the lower transistor T2, is expressed as D=T1on/(T1on+T2on), and decrease of the duty ratio D(=T1on/(T1on+T2on)) leads to increase of the voltage conversion ratio (=Vc/Vb) of the DC/DC converter 24.

Figure 4:
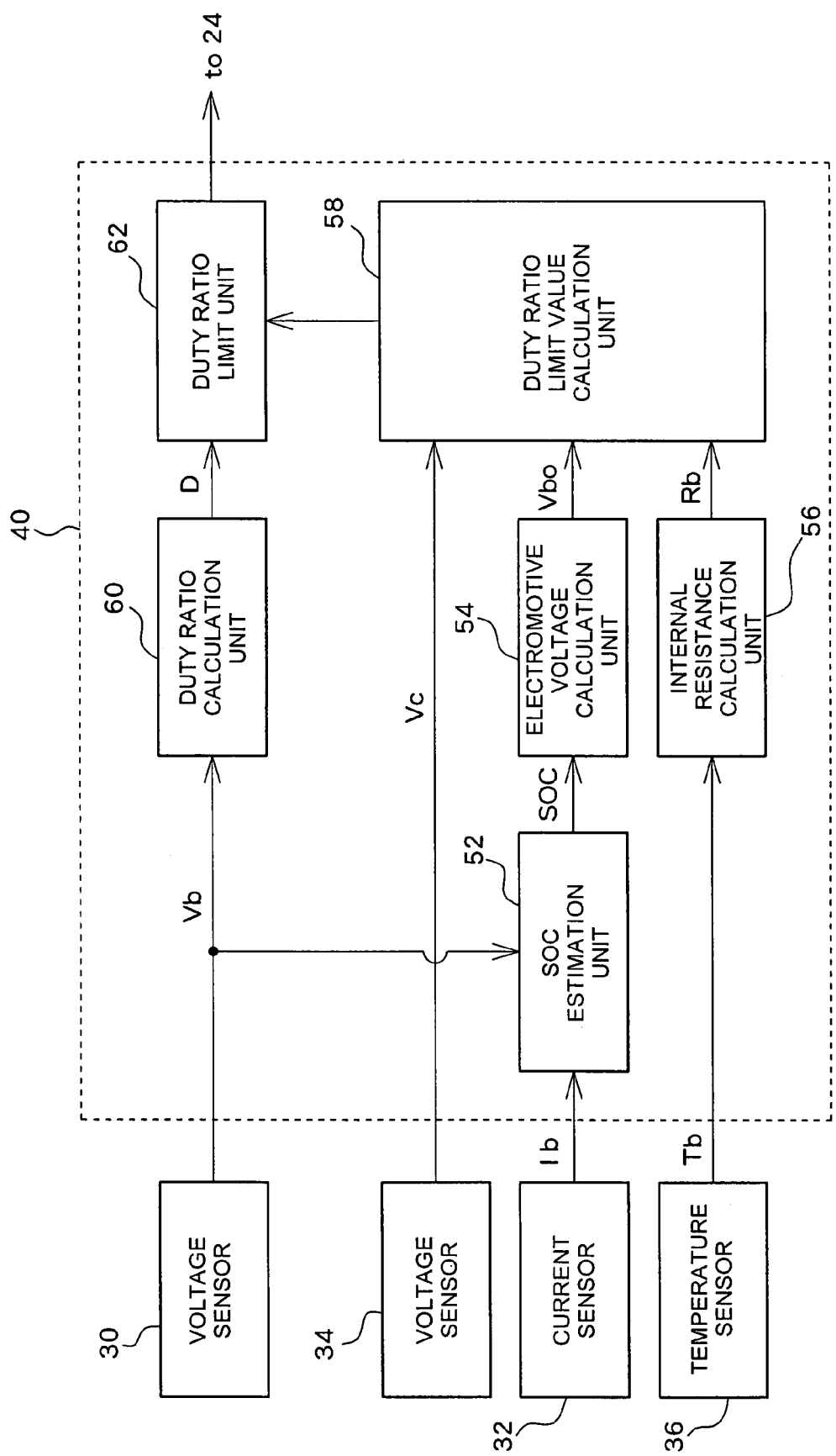
FIG. 4 is a block diagram showing a structure of an electronic control unit 40.

The electronic control unit 40 can be constructed as shown in the functional block diagram of FIG. 4, for example. Specifically, the electronic control unit 40 comprises an SOC estimation unit 52, an electromotive voltage calculation unit 54, an internal resistance calculation unit 56, a duty ratio limit value calculation unit 58, a duty ratio calculation unit 60, and a duty ratio limit unit 62, as described below.

The SOC estimation unit 52 estimates the SOC (state of charge) of the battery 22 and outputs the result to the electromotive voltage calculation unit 54. As the SOC of the battery 22 can be obtained based on the characteristics of the battery current Ib and battery voltage Vb, for example, the SOC estimation unit 52 can determine the SOC based on the input battery current Ib and battery voltage Vb.

Figure 2:
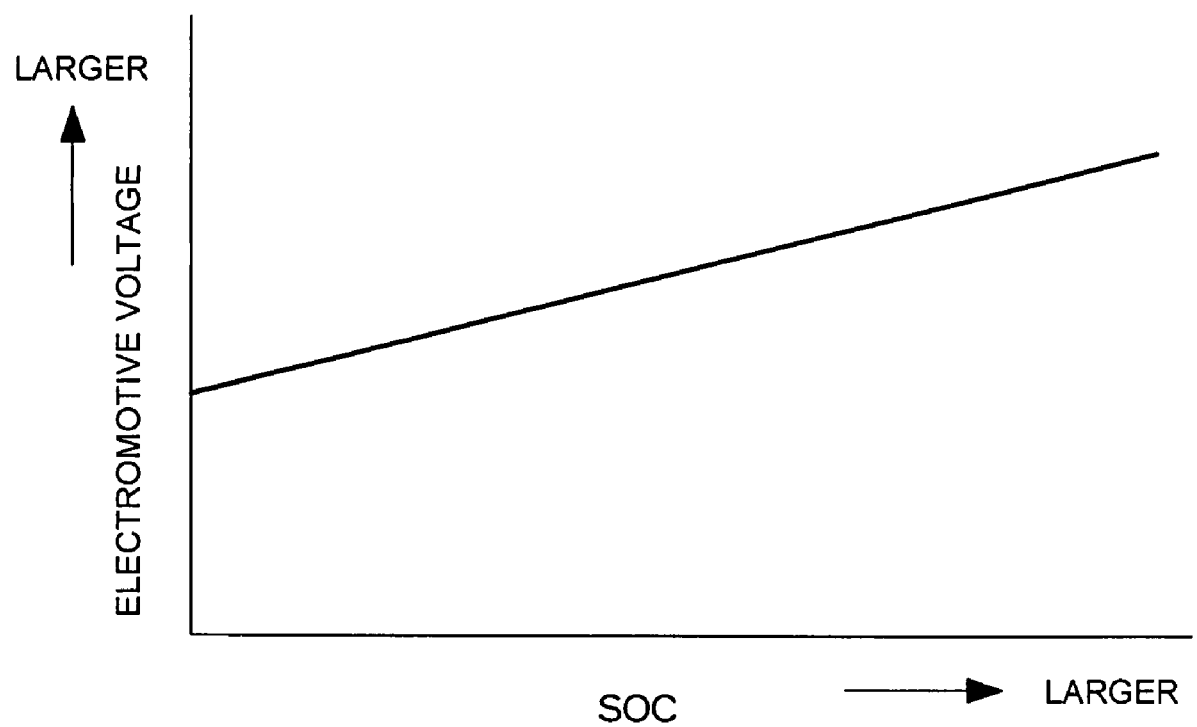
FIG. 2 is a diagram showing correlation between the SOC and an electromotive voltage Vbo of a battery 22.

The electromotive voltage calculation unit 54 calculates the electromotive voltage Vbo of the battery 22 and outputs the result to the duty ratio limit value calculation unit 58. In this embodiment, the SOC of the battery 22 and an electromotive voltage Vbo hold a correlation as shown in FIG. 2, for example. Therefore, the electromotive voltage calculation unit 54 can determine the battery electromotive voltage Vbo based on the input SOC of the battery 22.

Figure 5:
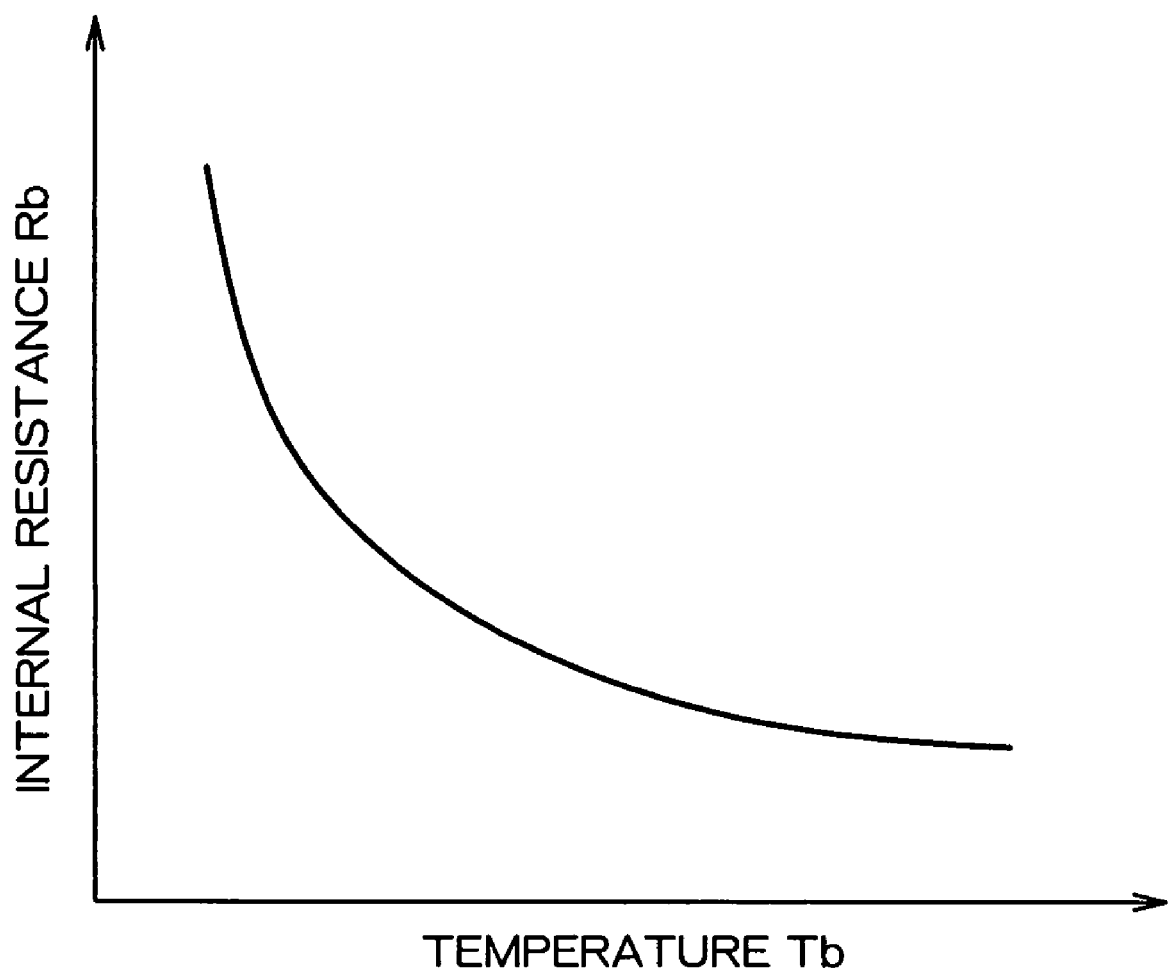
FIG. 5 is a diagram showing correlation between the internal resistance Rb and temperature Tb of the battery 22.

The internal resistance calculation unit 56 calculates the internal resistance Rb of the battery 22 and outputs the result to the duty ratio limit value calculation unit 58. As the temperature Tb and internal resistance Rb of the battery 22 hold a correlation as shown in FIG. 5, for example, the internal resistance calculation unit 56 can determine the internal resistance Rb of the battery 22 based on the input temperature Tb of the battery 22.

The duty ratio limit value calculation unit 58 calculates the lower limit value DL and upper limit value DH of the duty ratio of a switching control signal based on the input battery electromotive voltage Vbo, battery internal resistance Rb, and capacitor voltage Vc, and outputs the result to the duty ratio limit unit 62.

The lower limit value DL is calculated based on the battery electromotive voltage Vbo and capacitor voltage Vc, while the upper limit value DH is calculated based on the battery electromotive voltage Vbo, battery internal resistance Rb, and capacitor voltage Vc. Using the lower limit value DL and upper limit value DH, the acceptable range (between the lower limit value DL and the upper limit value DH) of the duty ratio D is set. Calculation of the lower limit value DL and upper limit value DH for a duty ratio D will be described in detail later.

The duty ratio calculation unit 60 calculates the duty ratio D of a switching control signal to be supplied to the transistors T1, T2 based on the input battery voltage Vb, and outputs the result to the duty ratio limit unit 62. Calculation of the duty ratio D will be described in detail later.

The duty ratio limit unit 62 limits the duty ratio D such that the duty ratio D of a switching control signal, which is calculated by the duty ratio calculation unit 60, falls within the acceptable range (between the lower limit value DL and the upper limit value DH) which is set by the duty ratio limit value calculation unit 58.

In more detail, when the duty ratio D is within the acceptable range (between the lower limit value DL and the upper limit value DH), the duty ratio limit unit 62 outputs a switching control signal of that duty ratio D to the transistors T1, T2 of the DC/DC converter 24. When the duty ratio D is smaller than the lower limit value DL, the duty ratio limit unit 62 outputs a switching control signal of the duty ratio DL to the transistors T1, T2. When the duty ratio D is larger than the upper limit value DH, the duty ratio limit unit 62 outputs a switching control signal of the duty ratio DH to the transistors T1, T2.

Operation of the thus structured driving system 20 of the embodiment, in particular, driving control of the DC/DC converter 24, will be described.

Figure 6:
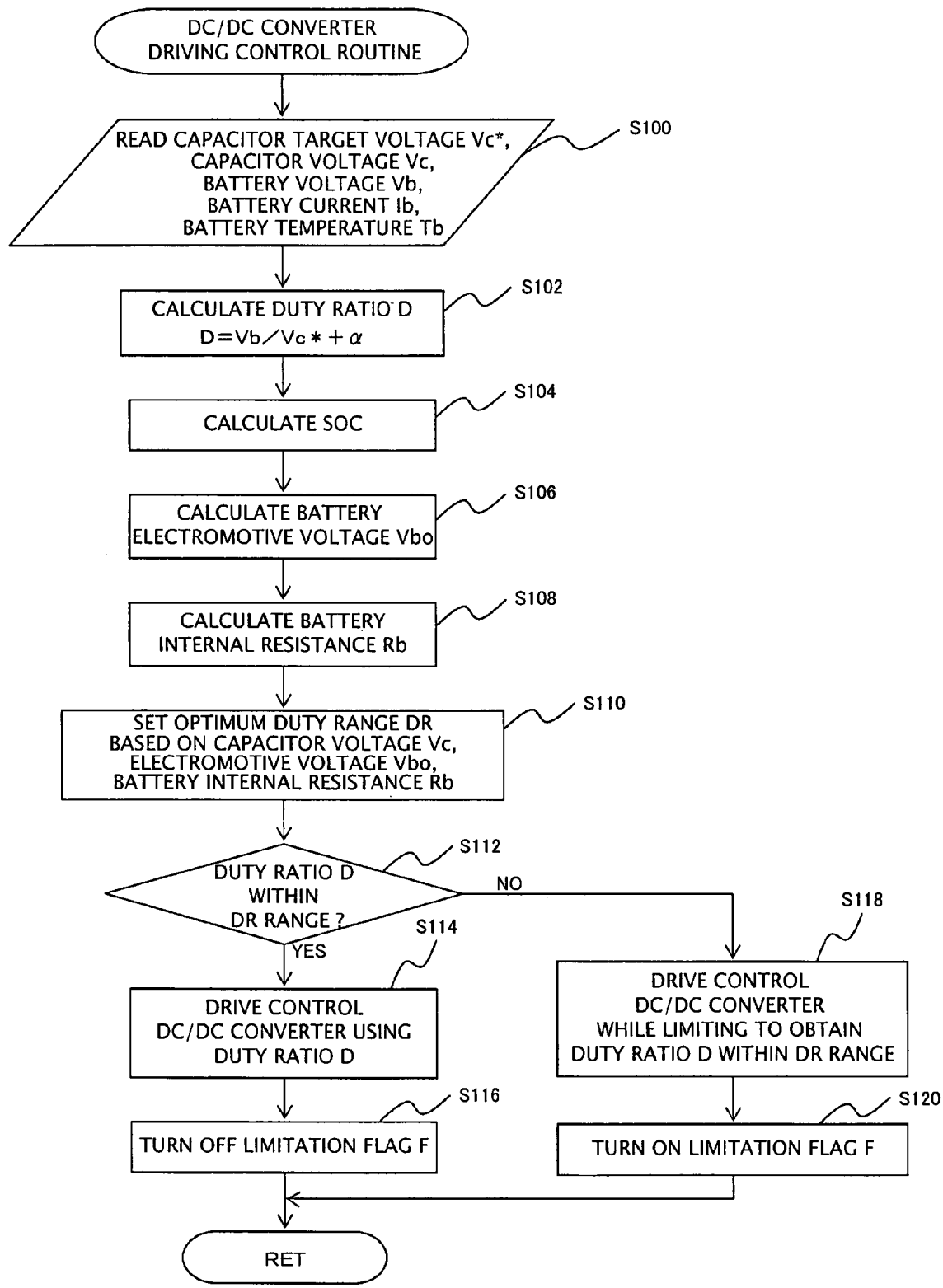
FIG. 6 is a flowchart of one exemplary DC/DC converter driving control routine executed by the electronic control unit 40 of the driving system 20 in this embodiment.

FIG. 6 is a flowchart of an exemplary DC/DC converter driving control routine to be executed by the electronic control unit 40 of the driving system 20 in the embodiment. This routine is repeatedly executed at a predetermined time interval (for example, 0.2 msec).

Specifically, upon start of the DC/DC converter driving control routine, the CPU 42 of the electronic control unit 40 reads a capacitor target voltage Vc*, a capacitor voltage Vc, a battery voltage Vb, a battery current Ib, and a battery temperature Tb (S100). Here, a capacitor target voltage Vc* is set based on required power P, which serves as a command value for driving the load 28, in other words, as a voltage value of the capacitor 26 which is necessary to drive the load 28 using the required power P.

After reading the information concerning the condition of the battery 22, the duty ratio calculation unit 60 calculates a duty ratio D (=T1on/(T1on+T2on)), which is a ratio between an on period (T1on) of the upper transistor T1 and an on period (T2on) of the lower transistor T2, based on the read capacitor target voltage Vc* and battery voltage Vb, using the expression (1) below, wherein α corresponds to correction of the duty ratio D (S102).

$$D = Vb/Vc^* + \alpha \tag{1}$$

Subsequently, the SOC estimation unit 52 calculates the SOC of the battery 22 based on the read battery voltage Vb and battery current Ib (S104), and the electromotive voltage calculation unit 54 calculates a battery electromotive voltage Vbo based on the SOC of the battery 22 (S106). The internal resistance calculation unit 56 calculates a battery internal resistance Rb based on the read battery temperature Tb (S108).

Subsequently, the duty ratio limit value calculation unit 58 sets the optimum duty range DR based on the capacitor voltage Vc, battery electromotive voltage Vbo, and battery internal resistance Rb (S110). Here, the optimum duty range DR is a range of duty ratios D, which corresponds to a range of power which can be extracted from a battery by driving the DC/DC converter 24.

In the following, an optimum duty range DR will be described in detail.

Power BP when the driving system 20 is viewed from the load 28 is expressed using the expression (2) below, based on the duty ratio D, capacitor voltage Vc, and battery current Ib.

$$BP = Vc \times Ib \times D \tag{2}$$

The battery current Ib is expressed using the expression (3) below.

$$Ib = (Vbo - D \times Vc)/Rb \tag{3}$$

Substitution of the expression (3) into the expression (2) results in the expression (4).

$$BP = -Vc^2/Rb \times (D - Vbo/2Vc)^2 + Vbo^2/4Rb \tag{4}$$

Figure 7:
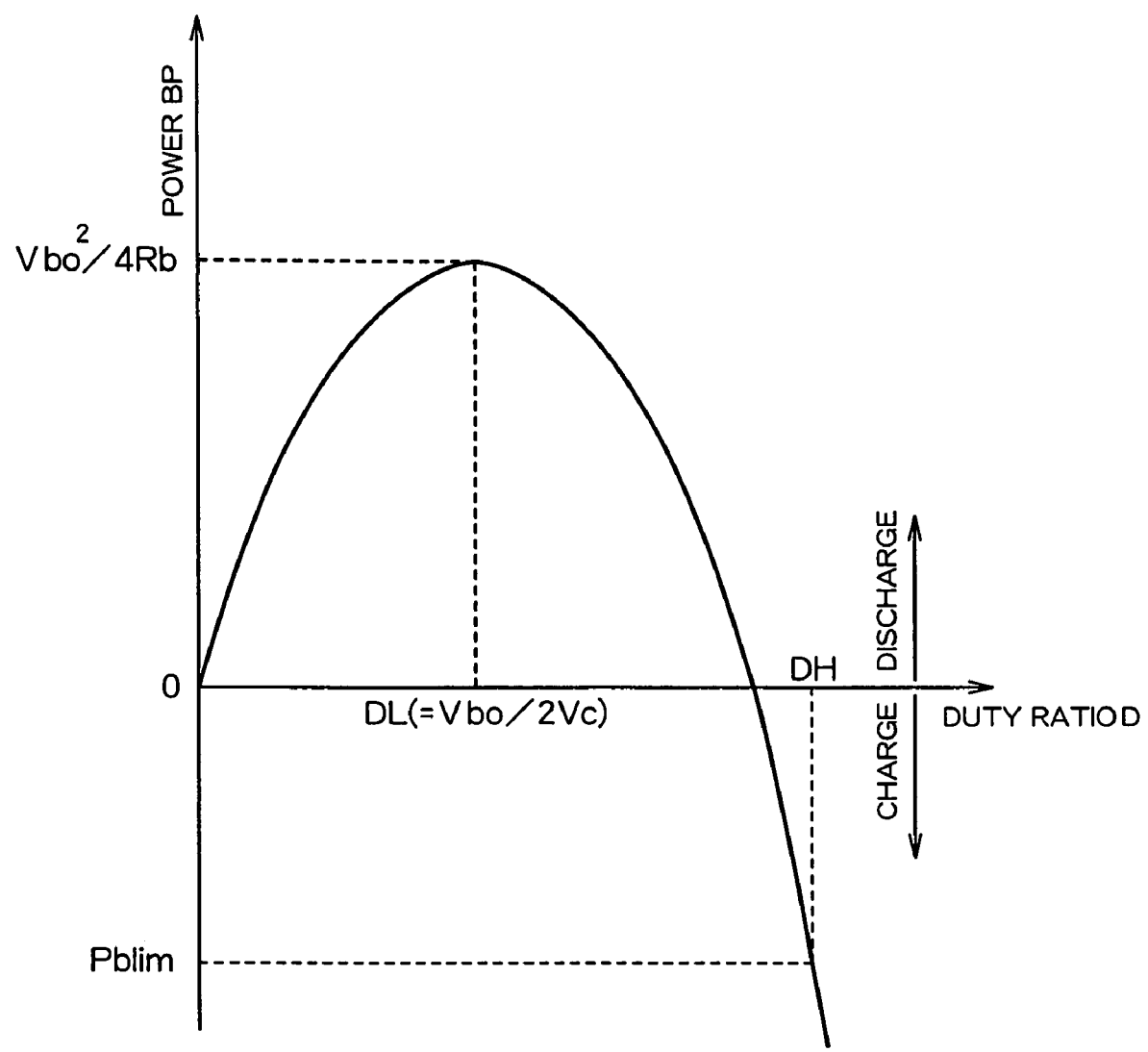
FIG. 7 is a diagram showing an example of power characteristics of the battery 22.

The expression (4) can be expressed as shown in FIG. 7 as a power characteristic of the battery 22 for correlation of the power BP of the battery 22 with respect to a duty ratio D of the transistors T1, T2. As shown in FIG. 7, in order to extract the maximum power $Vbo^2/4Rb$ from the battery 22, the DC/DC converter 24 should be controlled to be driven such that a duty ratio D becomes equal to a value Vbo/2Vc. As such, should the DC/DC converter 24 be controlled to be driven such that a duty ratio D becomes smaller than a value Vb/2Vc (that is, in the direction to increase the boosting rate), the power BP extracted from the battery 22 will decrease.

Therefore, by setting the lower limit value DL of the optimum duty range DR at Vbo/2 Vc, the maximum power BPmax can be reliably extracted from the battery 22 while driving the load 28 in a stable manner. Note that the power BP is considered positive when the battery 22 is discharging, and negative when the battery is charging.

Figure 8:
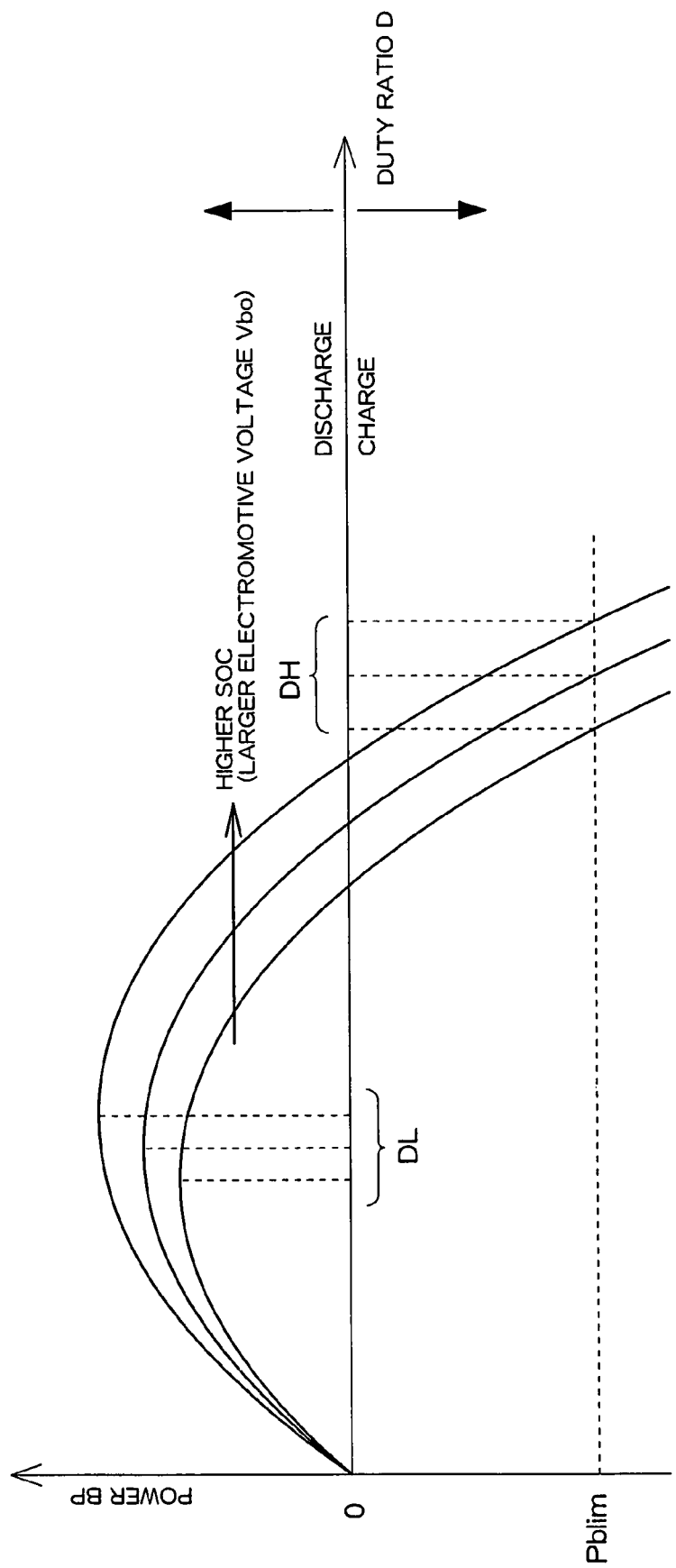
FIG. 8 is a diagram showing variation of the power characteristics of the battery 22 according to the SOC.

In this embodiment, as shown in FIG. 8, the battery electromotive voltage Vbo increases as the SOC of the battery 22 increases, or varies toward full charge, and consequently, the duty ratio D corresponding to the maximum power BPmax increases. Then, in order to maintain a condition in which the lower limit value DL is kept substantially equal to the duty ratio D corresponding to the maximum power BPmax even though the SOC of the battery 22 varies, the lower limit value DL(=Vbo/2Vc) is changed depending on the SOC of the battery 22. In more detail, the lower limit value DL(=Vbo/

2Vc) is increased as the SOC of the battery 22 increases, or varies toward the full state of charge.

It should be noted that it is not always necessary to set the lower limit value DL of the optimum duty range DR at the duty ratio Vbo/2Vc corresponding to the maximum power BPmax in the power characteristic of the battery 22. Alternatively, a value Vbo/2Vc+ΔD(ΔD>0), which is a slightly larger than the duty ratio Vbo/2Vc corresponding to the maximum power BPmax, for example, or a value Vbo/2Vc−ΔD, which is a slightly smaller than the duty ratio Vbo/2Vc may be set as the lower limit value DL.

In charging the battery 22 (at regeneration and with a negative power BP), limiting the duty ratio D such that an excessive electrical power is prevented from flowing into the battery 22 is preferable.

Here, assuming a limit value on the charge side of the battery power BP as Pblim (a negative constant), a duty ratio D with the battery power BP being Pblim can be expressed using the expression (5) mentioned below based on the expression (4) mentioned above.

$$D=(Vbo+(Vbo^2-4Rb\times Pblim)^{0.5})/2Vc \quad (5)$$

Therefore, in order to prevent the battery power BP from dropping below the limit value Pblim (that is, to prevent excessive electrical power from flowing into the battery 22), it is preferable to set the upper limit value DH of the optimum duty range DR at $(Vbo+(Vbo^2-4Rb\times Pblim)^{0.5})/2Vc$.

In this embodiment, as shown in FIG. 8, the battery electromotive voltage Vbo increases as the SOC of the battery 22 increases, or varies toward full charge, and consequently, the duty ratio D corresponding to the power Pblim increases.

Therefore, in order to maintain a condition in which the upper limit value DH remains substantially equal to the duty ratio D corresponding to the power Pblim even though the SOC of the battery 22 varies, the upper limit value DH $(=(Vbo+(Vbo^2-4Rb\times Pblim)^{0.5})/2Vc)$ is changed depending on the SOC of the battery 22. In more detail, the upper limit value DH is increased as the SOC of the battery 22 increases, or varies toward the full state of charge.

Figure 9:
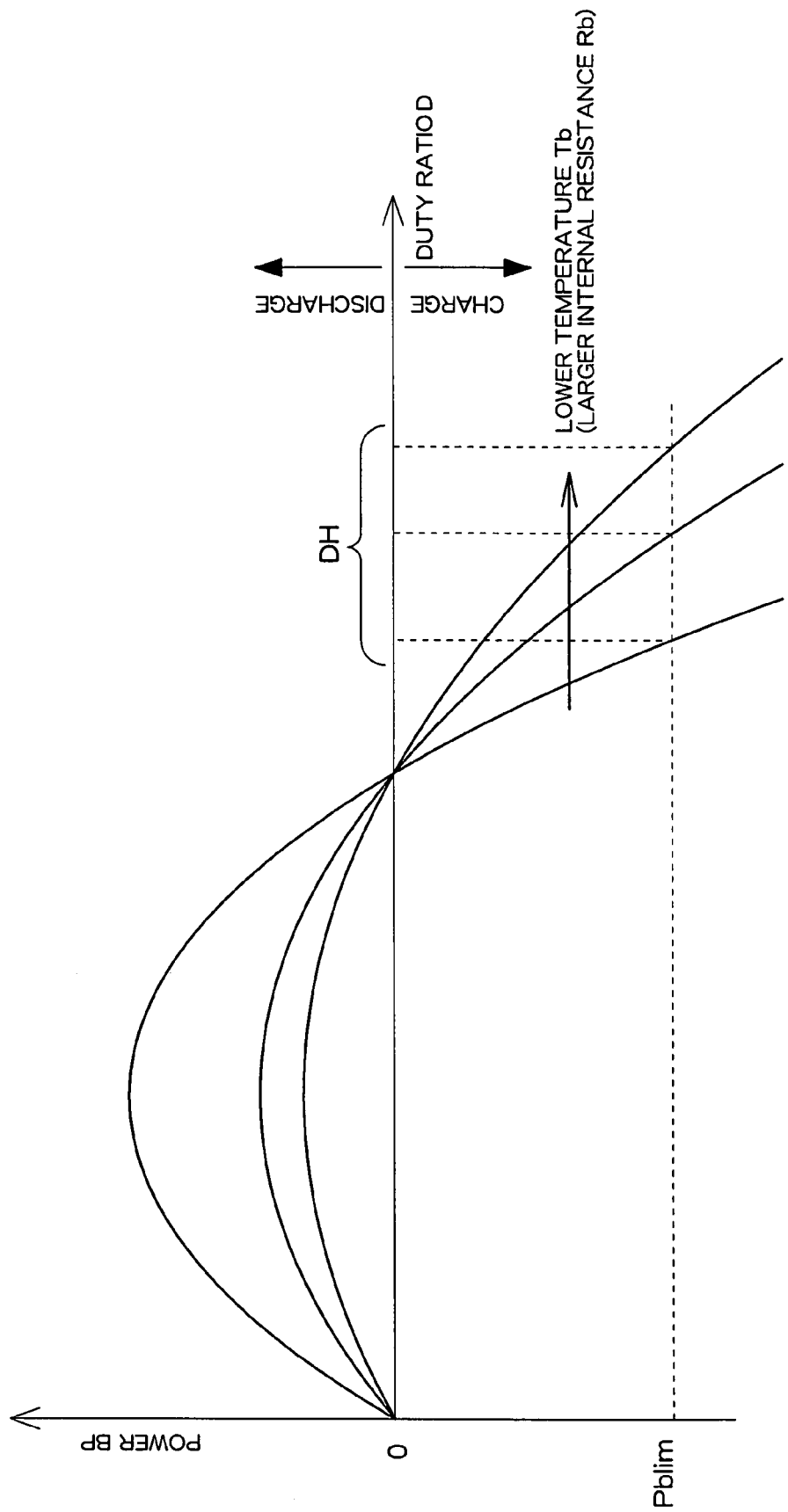
FIG. 9 is a diagram showing variation of the power characteristics of the battery 22 according to the internal resistance Rb.

Further, in this embodiment, as shown in FIG. 9, the duty ratio D corresponding to the power Pblim increases as the battery internal resistance Rb increases (battery temperature Tb decreases). Therefore, in order to maintain a condition in which the upper limit value DH remains substantially equal to the duty ratio D corresponding to the power Pblim even though the battery internal resistance Rb (battery temperature Tb) varies, the upper limit value DH is changed depending on the battery internal resistance Rb (battery temperature Tb).

In more detail, the upper limit value DH is increased as the battery internal resistance Rb increases, that is, as the battery temperature Tb drops.

When the optimum duty range DR, that is, the lower limit value DL and upper limit value DH, is set, the duty ratio limit unit 62 determines whether or not the duty ratio D calculated at step S102 is within the optimum duty range DR (between the lower limit value DL and the upper limit value DH) (S112).

When it is determined that the duty ratio D calculated at step S102 is within the optimum duty range DR, the duty ratio limit unit 62 controls to drive the DC/DC converter 24, using a switching control signal of the duty ratio D (step S114). Then, as indication of the fact that a duty ratio D is not limited, the limitation flag F is set off (S116), upon which this routine completes.

Meanwhile, when it is determined that the duty ratio D calculated at step S102 is outside the optimum duty range DR, the duty ratio limit unit 62 controls to drive the DC/DC converter 24, while limiting the duty ratio D so as to remain within the optimum duty range DR (S118).

That is, when the duty ratio D is smaller than the lower limit value DL, the duty ratio limit unit 62 controls to drive the DC/DC converter 24, using a switching control signal of the duty ratio DL. When the duty ratio D is larger than the upper limit value DH, the duty ratio limit unit 62 controls to drive the DC/DC converter 24, using a switching control signal of the duty ratio DH. Then, as indication of the fact that duty ratio D is limited, the limitation flag F is set on (step S120), upon which this routine completes.

In the above-described process, the SOC of the battery 22 is detected and the battery electromotive voltage Vbo is calculated every time the duty ratio D of a switching control signal to be output to the transistors T1, T2 is determined.

In the driving system 20 in the embodiment described above, the lower limit value DL of the duty ratio D is changed relative to the variation in the SOC of the battery 22. This can ensure a condition in which the lower limit value D1 remains substantially equal to the duty ratio D corresponding to the maximum power BPmax even though the SOC of the battery 22 varies and consequently the battery electromotive voltage Vbo varies. Consequently, the maximum power BPmax can be extracted from the battery 22 in a stable manner.

Therefore, even when electrical power of an amount corresponding to the power P requested by the load 28 cannot be extracted from the battery 22, drop in the voltage of the capacitor 26 can be more appropriately suppressed, and the load 28 can be driven in a more stable manner.

Further, as the upper limit value DH of the duty ratio is changed relative to the variation in the SOC of the battery 22, a condition in which the upper limit value DH remains substantially equal to the duty ratio D corresponding to the power Pblim can be ensured even should the SOC of the battery 22, and consequently the battery electromotive voltage Vbo, vary.

Still further, as the upper limit value DH of the duty ratio is changed relative to the variation in the battery internal resistance Rb, a condition in which the upper limit value DH remains substantially equal to the duty ratio D corresponding to the power Pblim can be ensured even when the battery internal resistance Rb varies.

Consequently, electrical power to be supplied to the battery 22 can be appropriately limited even when the SOC and/or internal resistance of the battery 22 varies.

As described above, in the driving system 20 in this embodiment, control to limit the voltage conversion ratio (a boosting ratio) of the DC/DC converter 24 by limiting the duty ratio D of a switching control signal to be supplied to the transistors T1, T2 can be more appropriately performed depending on the state of charge (SOC) of the battery 22.

It should be noted that the optimum duty range DR (between the lower limit value DL and the upper limit value DH), which is set at step S110 in the DC/DC converter driving control routine of FIG. 6, can alternatively be set in the process described below.

Initially, based on at least one of the current capacities of the transistors T1, T2 of the DC/DC converter 24 and of the battery 22, the maximum allowable current Ibmax is determined and pre-stored in the ROM 44 in the electronic control unit 40, for example.

That is, by selecting either one, or larger one, of the current capacities which can be supplied to the transistors T1, T2 and to the battery 22, the maximum allowable current Ibmax is determined. It should be noted that the ROM 44 is a non-volatility memory, preferably including a rewritable EEPROM and a flash memory.

At step S110 in the DC/DC converter driving control routine shown in FIG. 6, the duty ratio limit value calculation unit 58 sets the optimum duty range DR (between the lower limit value DL and the upper limit value DH) based on the maximum allowable current Ibmax, battery internal resistance Rb, battery electromotive voltage Vbo, and capacitor voltage Vc.

As shown in the above-mentioned expression (3), a battery current Ib is expressed as Ib=(Vbo−D×Vc)/Rb. Therefore, the duty ratio D is expressed as D=(Vbo−Rb×Ib)/Vc.

Then, the duty ratio limit value calculation unit 58 sets the lower limit value DL of the optimum duty range DR as (Vbo−Rb×Ibmax)/Vc, and the upper limit value DH as (Vbo−Rb×(−Ibmax))/Vc, such that the battery current Ib falls in the range between Ibmax and Ibmax (S110). Here, the positive sign attached to Ibmax corresponds to a direction of discharging from the battery 22, while the negative sign corresponds to the direction of charging.

In this embodiment, the battery electromotive voltage Vbo increases as the SOC of the battery 22 increases, or varies toward the full state of charge, and consequently, the duty ratio D corresponding to the currents Ibmax, −Ibmax increases.

Therefore, in order to maintain a condition in which the lower limit value DL and the upper limit value DH remain substantially equal to the duty ratios D corresponding to the currents Ibmax, −Ibmax, respectively, even should the SOC of the battery 22 vary, the lower limit value DL (=(Vbo−Rb×Ibmax)/Vc) and the upper limit value DH (=(Vbo−Rb×(−Ibmax))/Vc) are changed according to the SOC of the battery 22. In more detail, the lower limit value DL and the upper limit value DH are increased as the SOC of the battery 22 increases, or varies toward the full state of charge. Thereafter, by limiting the duty ratio D at step S112 and thereafter so as to fall within the optimum duty range DR (between the lower limit value DL and the upper limit value DH), the battery current Ib is limited so as not to exceed the maximum allowable currents of the transistors T1, T2 of the DC/DC converter 24 or the maximum allowable current of the battery 22.

In this embodiment, as the lower limit value DL and upper limit value DH of the duty ratio D are changed relative to the variation of the SOC of the battery 22, a condition in which the lower limit value DL and upper limit value DH are maintained substantially equal to the duty ratios D respectively corresponding to the currents Ibmax, −Ibmax can be ensured even when the SOC of the battery 22 varies and consequently the battery electromotive voltage Vbom varies.

Therefore, control to prevent the battery current Ib from exceeding the maximum allowable current of the transistors T1, T2 of the DC/DC converter 24 or the maximum allowable current of the battery 22 can be more appropriately performed depending on the state of charge (SOC) of the battery 22.

In the following, a driving system in a second embodiment will be described.

The hardware structure of the driving system in the second embodiment is identical to that of the driving system 20 in the first embodiment. An electronic control unit 40 can be constructed as shown in the functional block diagram of FIG. 10, for example.

The functional block diagram of FIG. 10 includes a current limit value calculation unit 64, to be described below, instead of the duty ratio limit value calculation unit 58 in FIG. 4.

The current limit value calculation unit 64 calculates the upper limit value IH of a battery current Ib based on the input battery electromotive voltage Vbo and battery internal resistance Rb, and outputs the result to the duty ratio limit unit 62. Using the upper limit value IH, the acceptable range of the battery current Ib is defined. Calculation of the upper limit value IH for a battery current Ib will be described in detail later.

The duty ratio limit unit 62 limits the duty ratio D of a switching control signal, which is calculated by the duty ratio calculation unit 60, such that the battery current Ib falls within the acceptable range (equal to or smaller than the upper limit value IH) which is set by the current limit value calculation unit 64.

In more detail, when the battery current Ib is within the acceptable range (equal to or smaller than the upper limit value IH), the duty ratio limit unit 62 outputs a switching control signal of the duty ratio D to the transistors T1, T2 of the DC/DC converter 24. When the battery current Ib is larger than the upper limit value IH, the duty ratio limit unit 62 outputs a switching control signal of a duty ratio D which is limited such that the battery current Ib remains equal to or smaller than the upper limit value IH, to the transistors T1, T2.

Figure 11:
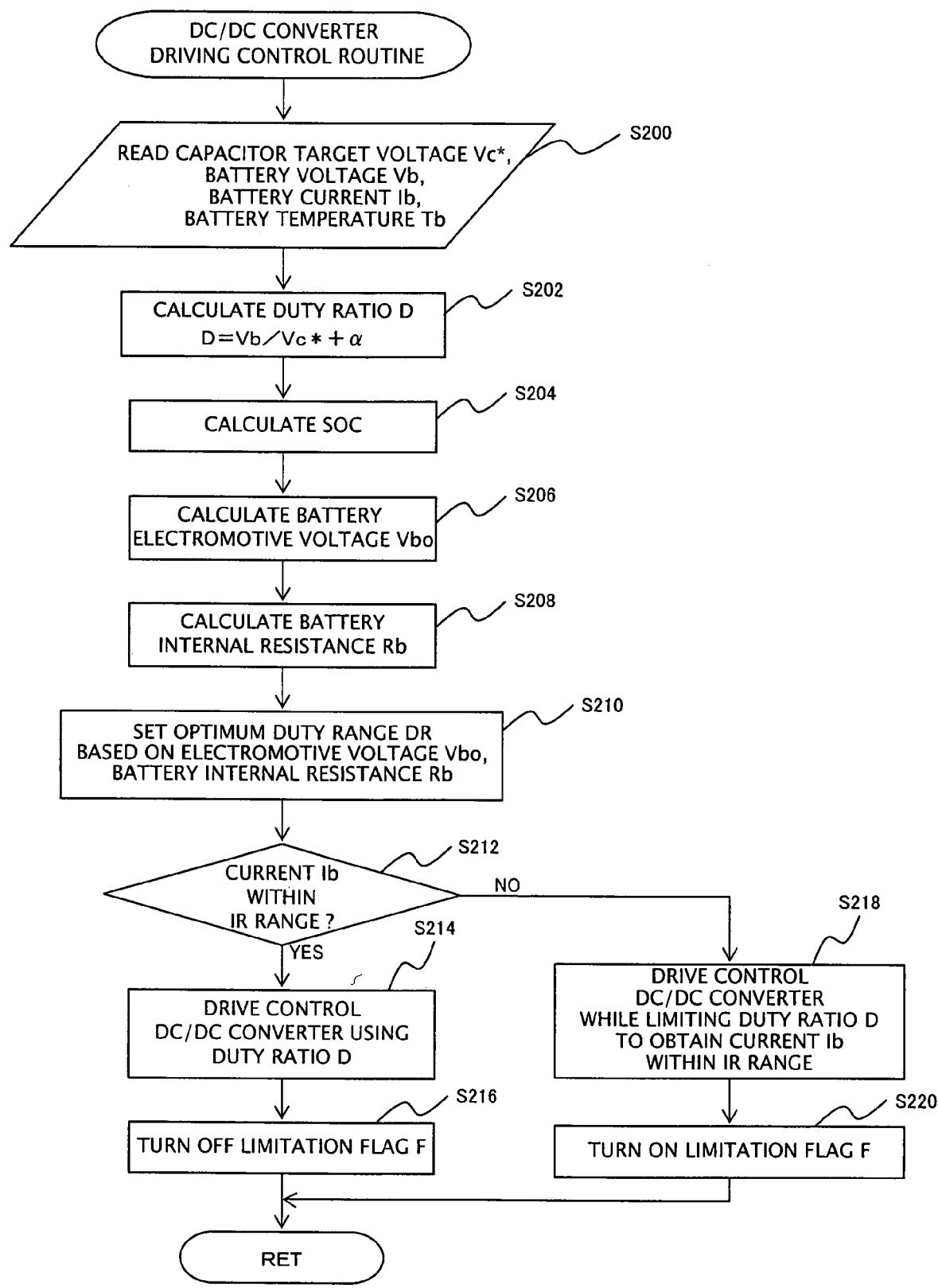
FIG. 11 is a flowchart of on exemplary DC/DC converter driving control routine executed by the electronic control unit 40 of the driving system in a modified embodiment.

FIG. 11 is a flowchart of an exemplary DC/DC converter driving control routine to be executed by the electronic control unit 40 of the driving system 20 in the second embodiment. This routine is repeatedly executed at a predetermined time interval (for example, 0.2 msec).

Specifically, upon start of the DC/DC converter driving control routine, the CPU 42 of the electronic control unit 40 reads a capacitor target voltage Vc*, a battery voltage Vb, a battery current Ib, and a battery temperature Tb (S200).

Then, the duty ratio calculation unit 60 calculates a duty ratio D (=T1on/(T1on+T2on)) based on the read capacitor target voltage Vc* and battery voltage Vb, using the expression (1) mentioned above (S202).

Subsequently, the SOC estimation unit 52 calculates the SOC of the battery 22 based on the read battery voltage Vb and battery current Ib (S204), and the electromotive voltage calculation unit 54 calculates a battery electromotive voltage Vbo based on the SOC of the battery 22 (S206). Further, the internal resistance calculation unit 56 calculates a battery internal resistance Rb based on the read battery temperature Tb (S208).

Then, the current limit value calculation unit 64 sets the optimum current range IR based on the battery electromotive voltage Vbo and battery internal resistance Rb (S210). Here, the optimum current range IR is a range of a battery current Ib, which corresponds to the range of power which can be extracted from a battery 22 by driving the DC/DC converter 24, specifically, a range having an upper limit value IH equal to a current value corresponding to the maximum power BPmax which can be extracted from the battery 22.

In the following, an optimum current range IR will be described in detail.

Power BP which can be extracted from the battery 22 can be expressed using the expression (6), based on the battery voltage Vb and battery current Ib.

$$BP = Vb \times Ib \qquad (6)$$

The battery voltage Vb can be expressed using the expression (7) mentioned below, based on the internal resistance Rb and electromotive voltage Vbo.

$$Vb = Vbo - Ib \times Rb \qquad (7)$$

Substitution of the expression (6) into the expression (7) results in the expression (8).

$$BP = (Vbo - Ib \times Rb) \times Ib \qquad (8)$$

-continued $$= -Rb \times (Ib - Vbo/2Rb)2 + Vbo2/4Rb$$

Figure 12:
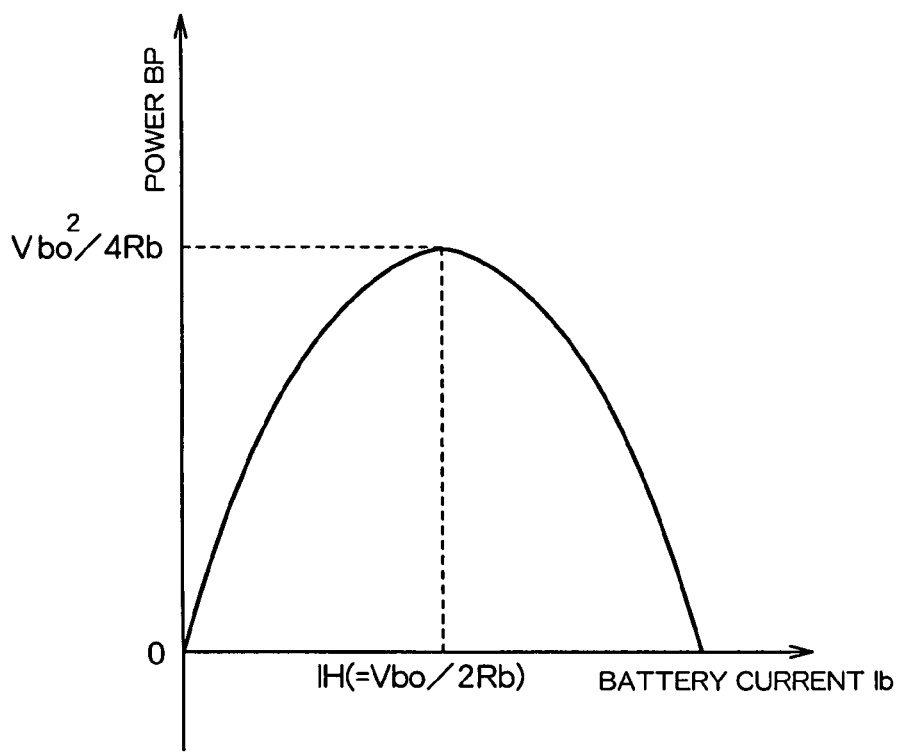
FIG. 12 is a diagram showing an example of power characteristics of the battery 22.

The expression (8) can be expressed as shown in FIG. 12 as a power characteristic of the battery 22 for correlation of the power BP of the battery 22 with respect to the battery current Ib.

As shown in FIG. 12, in order to extract the maximum power $Vbo^2/4Rb$ from the battery 22, the DC/DC converter 24 should be controlled to be driven such that a battery current Ib becomes equal to a value Vbo/2Rb. Therefore, should the DC/DC converter 24 be controlled so as to be driven such that the battery current Ib exceeds the value Vbo/2Rb (that is, in the direction to increase the boosting rate), an increased amount of electrical power is consumed by the internal resistance Rb of the battery 22 and, consequently, only a reduced amount of power BP can be extracted from the battery 22.

Therefore, by setting the upper limit value IH of the optimum current range IR at a value Vbo/2Rb, the maximum power BPmax from the battery 22 can be ensured while the load 28 can be driven in a stable manner.

Figure 13:
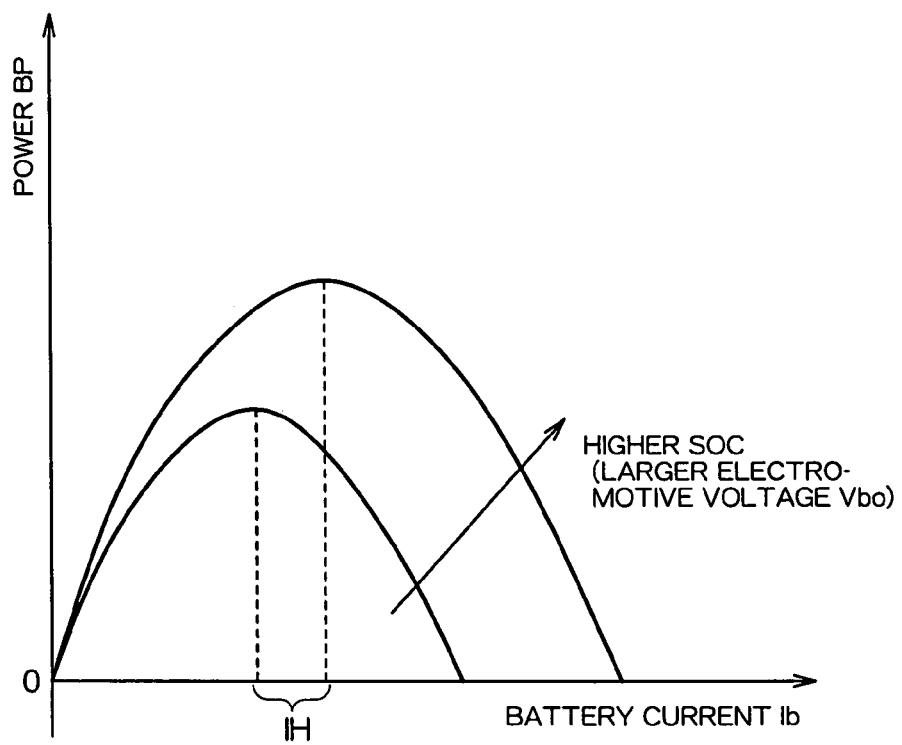
FIG. 13 is a diagram showing variation of the power characteristics of the battery 22 according to the SOC.

In this embodiment, as shown in FIG. 13, the battery electromotive voltage Vbo increases as the SOC of the battery 22 increases, or varies toward full charge, and consequently, the battery current Ib corresponding to the maximum power BPmax increases. Then, in order to maintain a condition in which the upper limit value IH is kept substantially equal to the battery current Ib corresponding to the maximum power BPmax, even if the SOC of the battery 22 varies, the upper limit value IH (=Vbo/2Rb) is changed depending on the SOC of the battery 22.

In more detail, the upper limit value IH (=Vbo/2Rb) is increased as the SOC of the battery 22 increases, or varies toward the full state of charge.

It should be noted that it is not always necessary to set the upper limit value IH of the optimum current range IR at the battery current Vbo/2Rb corresponding to the maximum power BPmax in the power characteristic of the battery 22. Alternatively, a value Vbo/2Rb+ΔI(ΔI>0), which is a slightly larger than the battery current Vbo/2Rb corresponding to the maximum power BPmax, for example, or a value Vbo/2Rb−ΔI, which is a slightly smaller than the battery current Vbo/2Rb may be set as the upper limit value IH.

When the optimum current range IR, that is, the upper limit value IH, is set as described above, the duty ratio limit unit 62 determines whether or not the battery current Ib falls within the optimum current range IR (whether or not equal to or smaller than the upper limit value IH) (S212).

When it is determined that the battery current Ib is within the optimum current range IR (equal to or smaller than the upper limit value IH), the duty ratio limit unit 62 controls to drive the DC/DC converter 24, using a switching control signal of the duty ratio D calculated at step S202 (S214). Then, as indication of the fact that a duty ratio D is not limited, the limitation flag F is set off (S116), upon which this routine completes.

Meanwhile, when it is determined that the battery current Ib is outside the optimum current range IR (larger than the upper limit value), the duty ratio limit unit 62 controls-to drive the DC/DC converter 24, using a switching control signal of a duty ratio D which is limited such that the battery current Ib remains within the optimum duty range DR (equal to or smaller than the upper limit value IH) (S218). Then, as indication of the fact that there is a limited duty ratio D, the limitation flag F is set on (S220), upon which this routine completes.

In the above-described process, the SOC of the battery 22 is detected and the battery electromotive voltage Vbo is calculated every time the duty ratio D of a switching control signal to output to the transistors T1, T2 is determined.

In the driving system in the second embodiment described above, the upper limit value IH of a battery current Ib is changed relative to the variation of the SOC of the battery 22. This can ensure a condition in which the upper limit value IH remains substantially equal to the battery current Ib corresponding to the maximum power BPmax even if the SOC of the battery 22 varies and consequently the battery electromotive voltage Vbo varies. Consequently, the maximum power BPmax can be extracted from the battery 22 in a stable manner.

In the following, a driving system in a third embodiment will be described.

The hardware structure of the driving, system in the third embodiment is identical to that of the driving system 20 in the first embodiment. The electronic control unit 40 can be constructed as shown in the functional block diagram of FIG. 14, for example.

Figure 10:
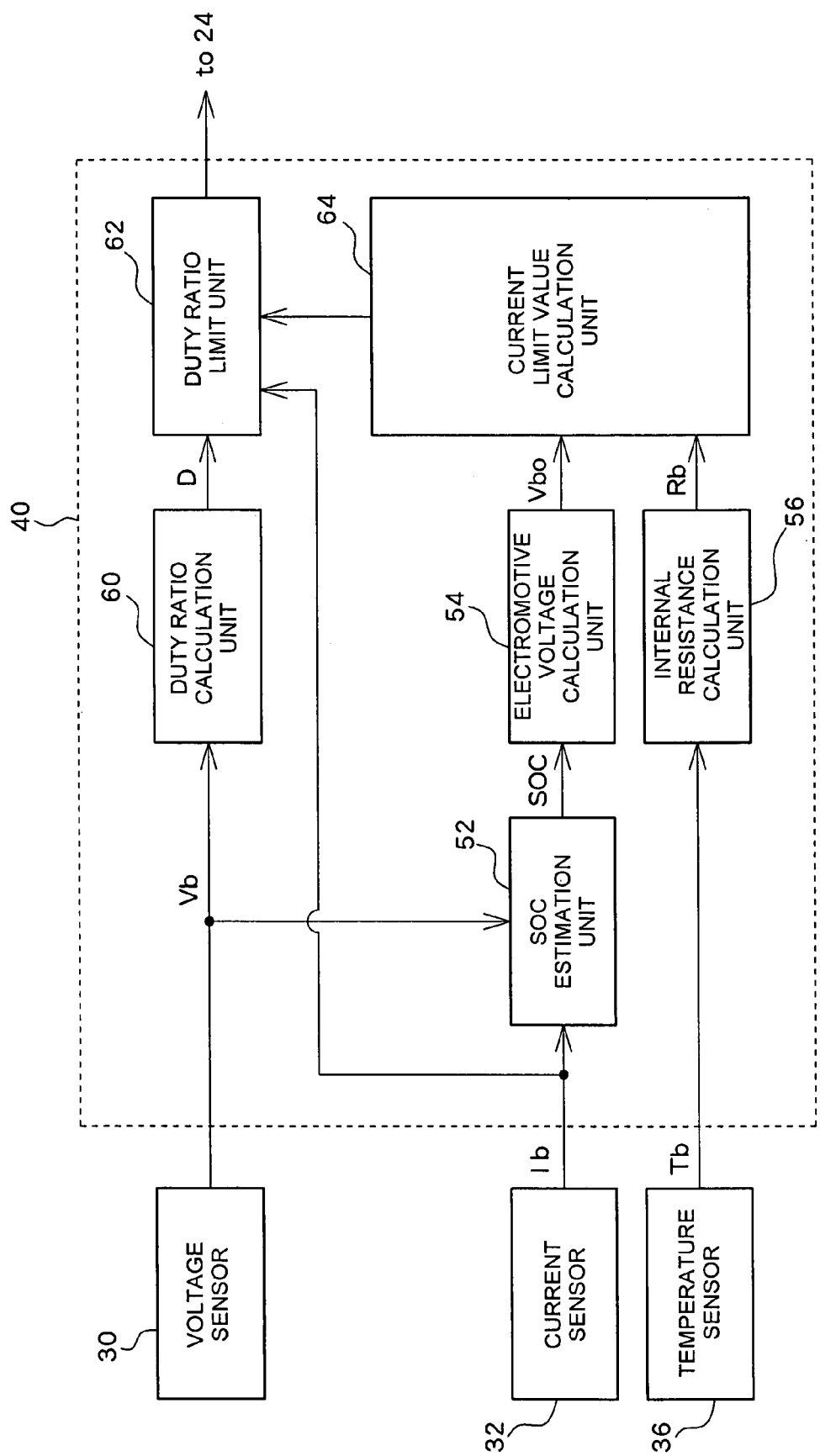
FIG. 10 is a block diagram showing another structure of the electronic control unit 40.
Figure 14:
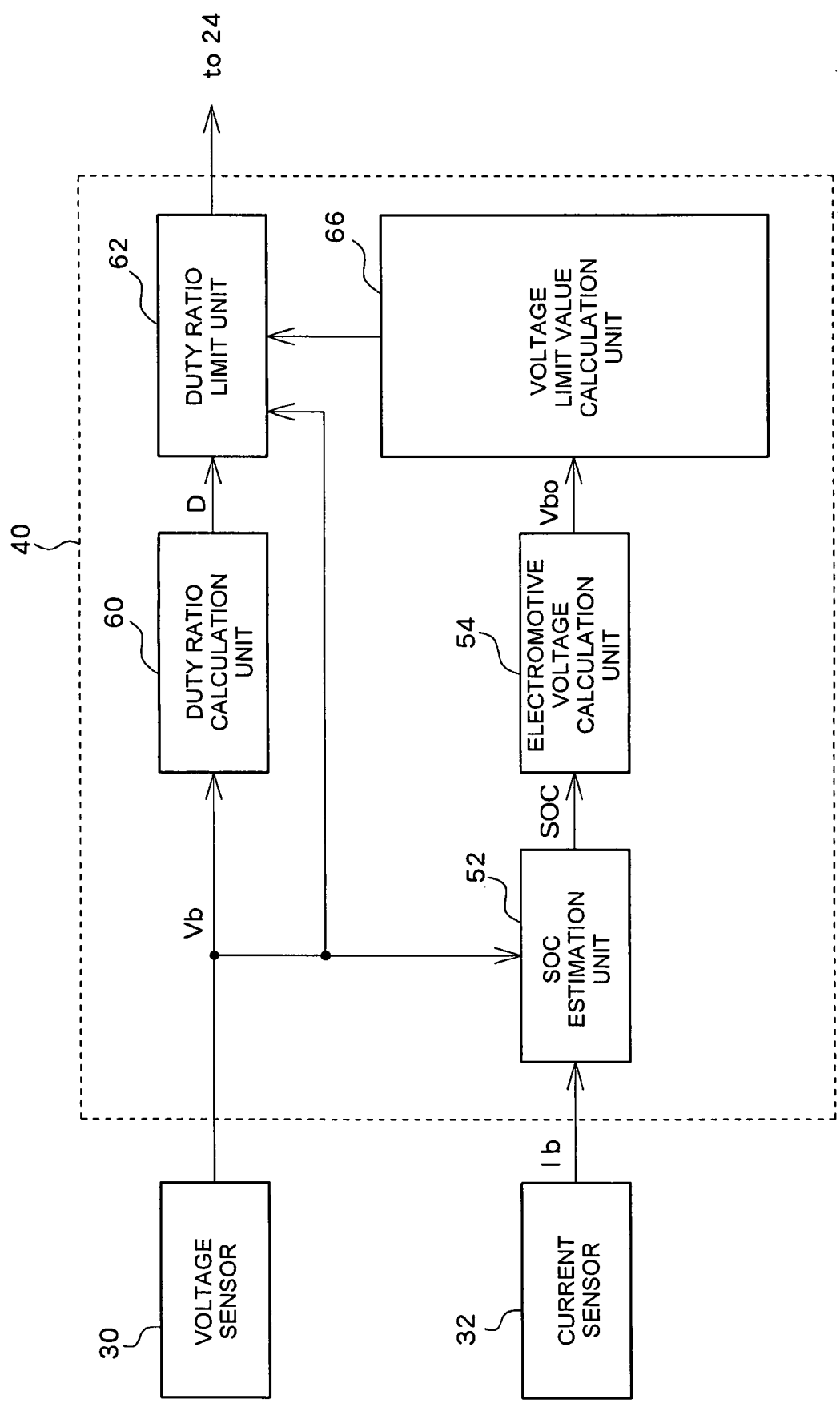
FIG. 14 is a block diagram showing another structure of the electronic control unit 40.

The functional block diagram of FIG. 14 does not show the internal resistance calculation unit 56, which is shown in FIG. 10, and includes a voltage limit value calculation unit 66, to be described below, instead of the current limit value calculation unit 64 in FIG. 10.

The voltage limit value calculation unit 66 calculates the lower limit value VL of a battery voltage Vb based on the input battery electromotive voltage Vbo, and outputs the result to the duty ratio limit unit 62. Using the lower limit value VL, the acceptable range of the battery voltage Vb is defined. Calculation of the lower limit value VL for a battery voltage Vb will be described in detail later.

The duty ratio limit unit 62 limits the duty ratio D of a switching control signal, which is calculated by the duty ratio calculation unit 60, such that the battery voltage Vb falls within the acceptable range (equal to or larger than the lower limit value VL), which is set by the voltage limit value calculation unit 66.

In more detail, when the battery voltage Vb is within the acceptable range (equal to or larger than the lower limit value VL), the duty ratio limit unit 62 outputs a switching control signal of the duty ratio D to the transistors T1, T2 of the DC/DC converter 24. When the battery voltage Vb is smaller than the lower limit value VL, the duty ratio limit unit 62 outputs a switching control signal of a duty ratio D which is limited such that the battery voltage Vb remains equal to or larger than the lower limit value VL, to the transistors T1, T2.

Figure 15:
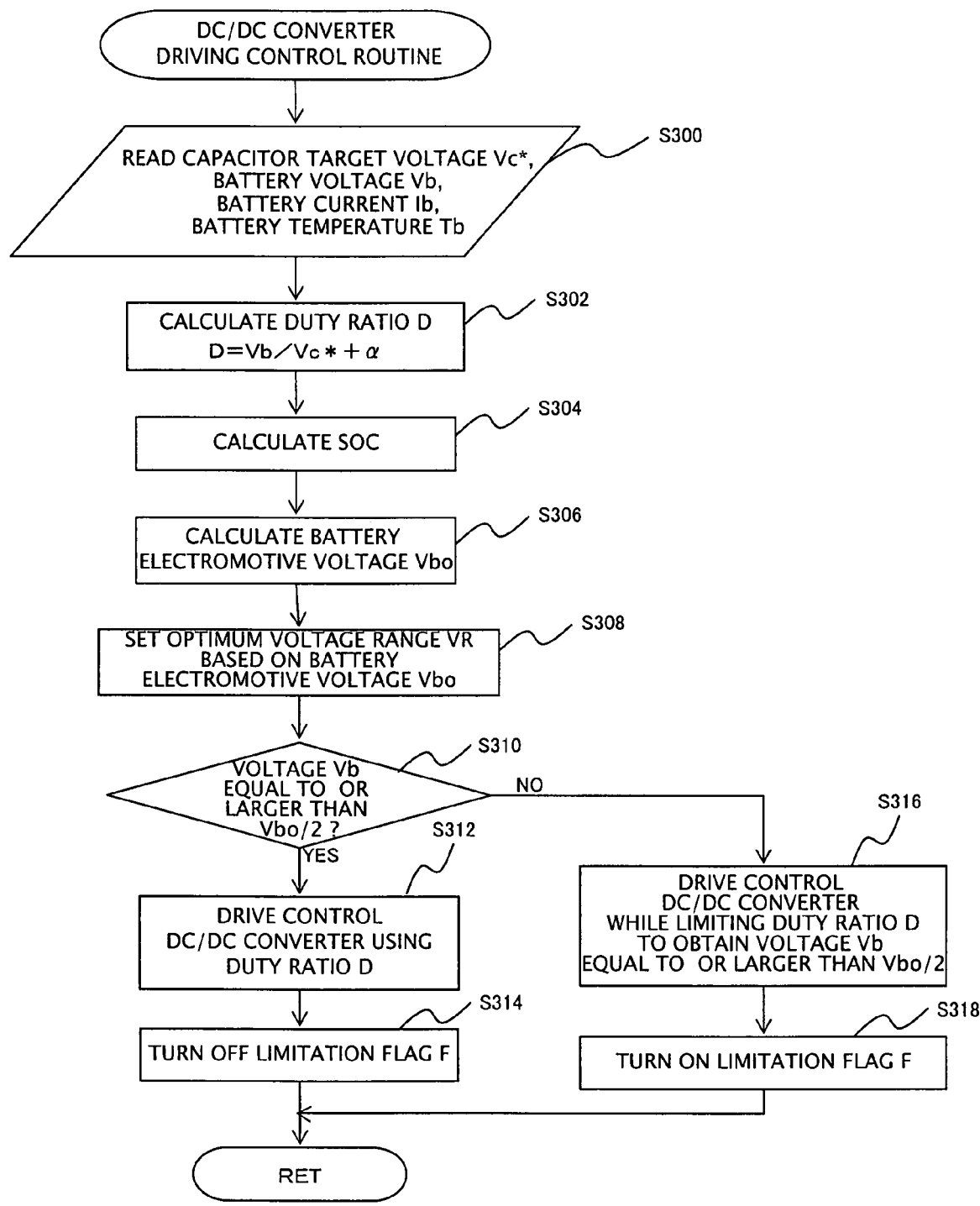
FIG. 15 is a flowchart of one exemplary DC/DC converter driving control routine executed by the electronic control unit 40 of the driving system in a modified embodiment.

FIG. 15 is a flowchart of an exemplary DC/DC converter driving control routine to be executed by the electronic control unit 40 of the driving system in the third embodiment. This routine is repeatedly executed at predetermined intervals (for example, 0.2 msec).

Specifically, upon start of the DC/DC converter driving control routine, the CPU 42 of the electronic control unit 40 reads a capacitor target voltage Vc*, a battery voltage Vb, and a battery current Ib (S300).

Then, the duty ratio calculation unit 60 calculates a duty ratio D (=T1on/(T1on+T2on)), based on the read capacitor target voltage Vc* and battery voltage Vb, using the expression (1) mentioned above (S302).

Subsequently, the SOC estimation unit 52 calculates the SOC of the battery 22 based on the read battery voltage Vb and battery current Ib (S304), and the electromotive voltage calculation unit 54 calculates a battery electromotive voltage Vbo based on the SOC of the battery 22 (S306).

Then, the voltage limit value calculation unit 66 sets the optimum voltage range VR based on the battery electromotive voltage Vbo (S308).

Here, the optimum voltage range VR is a range of a battery voltage Vb, which corresponds to the range of power which can be extracted from a battery by driving the DC/DC converter 24, specifically, a range having the lower limit value VL which is equal to a voltage value corresponding to the maximum power BPmax which can be extracted from the battery 22.

In the following, the optimum voltage range VR will be described in detail.

A battery voltage Vb can be calculated using the following expression (9) based on the battery electromotive voltage Vbo, battery current Ib, and internal resistance Rb.

$$Vb = Vbo - Ib \times Rb \tag{9}$$

Meanwhile, a battery current Ib when the maximum power BPmax is extracted from a battery has a value Vbo/2Rb, as described in connection with the driving system in the second embodiment, and the battery voltage Vb at that time can be expressed as the expression (10).

$$Vb = Vbo/2 \tag{10}$$

Therefore, in order to extract the maximum power $Vbo^2/4Rb$ from the battery 22, the DC/DC converter 24 should be controlled so as to be driven such that the battery voltage Vb becomes equal to a value Vbo/2. Therefore, should the DC/DC converter 24 be controlled to be driven such that the battery voltage Vb becomes smaller than a value Vbo/2 (that is, in the direction to increase a boosting rate), an increased amount of electrical power is consumed by the internal resistance Rb of the battery 22 and, consequently, an only a reduced amount of power BP can be extracted from the battery 22.

Therefore, by setting the lower limit value VL of the optimum voltage range VR at a value Vbo/2, the maximum power BPmax can be reliably extracted from the battery 22 while the load 28 can be driven in a stable manner.

In this embodiment, the battery electromotive voltage Vbo increases as the SOC of the battery 22 increases, or varies toward the full state of charge, and consequently, the battery voltage Vb corresponding to the maximum power BPmax becomes larger. Then, in order to maintain a condition in which the lower limit value VL is kept substantially equal to the battery voltage Vb corresponding to the maximum power BPmax even if the SOC of the battery 22 varies, the lower limit value VL(=Vbo/2) is changed depending on the SOC of the battery 22.

In more detail, the lower limit value VL (=Vbo/2) is increased as the SOC of the battery 22 increases, or varies toward the full state of charge.

It should be noted that it is not always necessary to set the lower limit value VL of the optimum current range IR at the battery voltage Vbo/2 corresponding to the maximum power BPmax in the power characteristics of the battery 22. Alternatively, a value Vbo/2+ΔV(ΔV>0), which is a slightly larger than the battery voltage Vbo/2 corresponding to the maximum power BPmax, for example, or a value Vbo/2−ΔV, which is a slightly smaller than the battery voltage Vbo/2, may be set at the lower limit value VL.

When the optimum voltage range VR, that is, the lower limit value VL is set as described above, the duty ratio limit unit 62 determines whether or not the battery voltage Vb falls within the optimum voltage range VR (whether or not it is equal to or larger than the lower limit value VL=Vbo/2) (S310).

When it is determined that the battery voltage Vb is within the optimum voltage range VR (equal to or larger than the lower limit value VL), the duty ratio limit unit 62 controls to drive the DC/DC converter 24, using a switching control signal of the duty ratio D calculated at step S302 (S312). Then, as indication of the fact that a duty ratio D is not limited, the limitation flag F is set off (step S314), upon which this routine completes.

Meanwhile, when it is determined that the battery voltage Vb is outside the optimum voltage range VR (smaller than the lower limit value VL), the duty ratio limit unit 62 controls to drive the DC/DC converter 24, using a switching control signal of a duty ratio D which is limited such that the battery voltage Vb falls in the optimum voltage range VR (equal to or larger than the lower limit value VL) (S316). Then, as indication of the fact that a duty ratio D is limited, the limitation flag F is set on (step S318), upon which this routine completes.

In the above-described processing, the SOC of the battery 22 is detected and the battery electromotive voltage Vbo is calculated every time the duty ratio D of a switching control signal to be output to the transistors T1, T2 is determined.

In the driving system in the third embodiment described above, the lower limit value VL of battery voltage Vb is changed relative to the variation of the SOC of the battery 22. This can ensure a condition in which a lower limit value VL remains substantially equal to the battery voltage Vb corresponding to the maximum power BPmax even though the SOC of the battery 22 varies and consequently the battery electromotive voltage Vbo varies. Consequently, the maximum power BPmax can be extracted from the battery 22 in a stable manner.

In the driving systems in the first through third embodiments, the electronic control unit 40 controls to drive the load 28, as well as the DC/DC converter 24. However, drive control for the DC/DC converter 24 and the load 28 may be conducted by different electronic control units which exchange information via communication.

Although the driving systems in the first through third embodiments respectively comprise a capacitor 26 arranged between the DC/DC converter 24 and the load 28, a driving system having no such a capacitor may also be used.

Alternatively, a control system responsible for drive control of a DC/DC converter and/or a load may preferably be a program for causing a computer to operate and/or a computer readable recording media, such as CD-ROM, DVD-ROM, and a flexible disk which stores this program. With this program installed into, and executed on, a computer, the advantage of the present invention can be attained.

It should be noted that although the present invention has been described with reference to its embodiments in the above, the present invention is not limited to these embodiments, and that the present invention can be practiced in various forms which do not depart from the gist of the present invention.

The invention claimed is:

1. A control apparatus for use in a voltage conversion apparatus which converts, for output, a DC voltage supplied from a chargeable and dischargeable storage battery into a desired voltage through switching operation of a switching element, the control apparatus capable of controlling a voltage conversion ratio by adjusting a duty ratio of a switching control signal to be supplied to the switching element, comprising:

an acceptable range setting unit for setting the acceptable range of the duty ratio of a switching control signal based on power characteristics of the storage battery representing a relationship of the power of the storage battery relative to the duty ratio;

a duty ratio limit unit for limiting the duty ratio of the switching control signal such that the duty ratio falls in the acceptable range; and a state of charge acquiring unit for acquiring information about a state of charge of the storage battery, wherein the acceptable range setting unit changes the acceptable range relative to variation in the state of charge of the storage battery.

2. The control apparatus of the voltage conversion apparatus according to claim 1, wherein the acceptable range setting unit changes a lower limit value of the acceptable range relative to variation in the state of charge of the storage battery, and the duty ratio limit unit limits the duty ratio of the switching control signal such that the duty ratio becomes equal to or larger than the lower limit value.

3. The control apparatus of the voltage conversion apparatus according to claim 2, wherein the acceptable range setting unit increases the lower limit value relative to variation in the state of charge of the storage battery toward a full state of charge.

4. The control apparatus of the voltage conversion apparatus according to claim 2, wherein the voltage conversion apparatus increases the voltage conversion ratio relative to decrease of the duty ratio of the switching control signal, and the lower limit value is substantially equal to a duty ratio corresponding to a maximum power in the power characteristics of the storage battery.

5. The control apparatus of the voltage conversion apparatus according to claim 1, wherein the acceptable range setting unit changes an upper limit value of the acceptable range relative to variation in the state of charge of the storage battery, and the duty ratio limit unit limits the duty ratio of the switching control signal such that the duty ratio becomes equal to or smaller than the upper limit value.

6. The control apparatus of the voltage conversion apparatus according to claim 5, wherein the acceptable range setting unit increases the upper limit value relative to variation in the state of charge of the storage battery toward a full state of charge.

7. The control apparatus of the voltage conversion apparatus according to claim 5, further comprising an internal resistance acquiring unit for acquiring information about internal resistance the storage battery, wherein the acceptable range setting unit changes the upper limit value of the acceptable range relative to variation in the internal resistance of the storage battery.

8. The control apparatus of the voltage conversion apparatus according to claim 7, wherein the acceptable range setting unit increases the upper limit value of the acceptable range relative to increase of the internal resistance of the storage battery.

9. A control apparatus for use in a voltage conversion apparatus which converts, for output, a DC voltage supplied from a chargeable and dischargeable storage battery into a desired voltage through switching operation of a switching element, the control apparatus capable of controlling a voltage conversion ratio by adjusting a duty ratio of a switching control signal to be supplied to the switching element, comprising:

an acceptable range setting unit for setting an acceptable range of the duty ratio of a switching signal such that a current of the storage battery falls within a predetermined range;

a duty ratio limit unit for limiting the duty ratio of the switching control signal such that the duty ratio falls in the acceptable range; and a state of charge acquiring unit for acquiring information about a state of charge of the storage battery, wherein the acceptable range setting unit changes the acceptable range relative to variation in the state of charge of the storage battery.

10. A control apparatus for use in a voltage conversion apparatus which converts, for output, a DC voltage supplied from a chargeable and dischargeable storage battery into a desired voltage through switching operation of a switching element, the control apparatus capable of controlling a voltage conversion ratio by adjusting a duty ratio of a switching control signal to be supplied to the switching element, comprising:

a current detection unit for detecting a current of the storage battery;

an acceptable range setting unit for setting an acceptable range of the current of the storage battery based on power characteristics of the storage battery representing a relationship of the power relative to the current of the storage battery;

a duty ratio limit unit for limiting the duty ratio of the switching control signal such that the current of the storage battery falls in the acceptable range; and a state of charge acquiring unit for acquiring information about a state of charge of the storage battery, wherein the acceptable range setting unit changes the acceptable range relative to variation in the state of charge of the storage battery.

11. A control apparatus for use in a voltage conversion apparatus which converts, for output, a DC voltage supplied from a chargeable and dischargeable storage battery into a desired voltage through switching operation of a switching element, the control apparatus capable of controlling a voltage conversion ratio by adjusting a duty ratio of a switching control signal to be supplied to the switching element, comprising:

a voltage detection unit for detecting a voltage of the storage battery;

a duty ratio limit unit for limiting the duty ratio of the switching control signal such that the voltage of the storage battery falls in the acceptable range;

a state of charge acquiring unit for acquiring information about a state of charge of the storage battery; and an acceptable range setting unit for changing the acceptable range relative to variation in the state of charge of the storage battery.

12. The control apparatus for the voltage conversion apparatus according to claim 1, wherein the voltage conversion apparatus comprises:

a reactor having one end connected to one end of the storage battery;

a first switching element arranged between the other end of the reactor and an output terminal of the voltage conversion apparatus; and a second switching element arranged between the other end of the reactor and other end of the storage battery, wherein the duty ratio of the switching control signal is expressed as T1on/(T1on+T2on), T1on representing an on period of the first switching element, and T2 on representing an on period of the second switching element.

13. The control apparatus for the voltage conversion apparatus according to claim 1, wherein the storage battery is a lithium ion secondary battery.

14. A control method for use by a voltage conversion apparatus which converts, for output, a DC voltage supplied from a chargeable and dischargeable storage battery into a desired voltage through switching operation of a switching element, the control method capable of controlling a voltage conversion ratio by adjusting a duty ratio of a switching control signal to be supplied to the switching element, comprising:
   acquiring information about a state of charge of the storage battery;
   setting an acceptable range of the duty ratio of a switching control signal based on power characteristics of the storage battery representing a relationship of the power of the storage battery relative to the duty ratio of a switching control signal while changing the acceptable range of the duty ratio of the switching control signal relative to variation in the state of charge of the storage battery; and
   limiting the duty ratio of the switching control signal such that the duty ratio falls in the acceptable range.

15. A control method for use by a voltage conversion apparatus which converts, for output, a DC voltage supplied from a chargeable and dischargeable storage battery into a desired voltage through switching operation of a switching element, the control method capable of controlling a voltage conversion ratio by adjusting a duty ratio of a switching control signal to be supplied to the switching element, comprising:
   acquiring information about a state of charge of the storage battery;
   setting an acceptable range of the duty ratio of the switching control signal such that a current of the storage battery falls in a predetermined setting range while changing the acceptable range of the duty ratio of the switching control signal relative to variation in the state of charge of the storage battery; and
   limiting the duty ratio of the switching control signal such that the duty ratio falls in the acceptable range.

16. A control method for use by a voltage conversion apparatus which converts, for output, a DC voltage supplied from a chargeable and dischargeable storage battery into a desired voltage through switching operation of a switching element, the control method capable of controlling a voltage conversion ratio by adjusting a duty ratio of a switching control signal to be supplied to the switching element, comprising:
   detecting a current of a storage battery;
   acquiring information about a state of charge of the storage battery;
   setting an acceptable range of the current of the storage battery based on power characteristics of the storage battery representing a relationship of the power relative to the current of the storage battery while changing the acceptable range of the current of the storage battery relative to variation in the state of charge of the storage battery; and
   limiting the duty ratio of the switching control signal such that the current of the storage battery falls in the acceptable range.

17. A control method for use by a voltage conversion apparatus which converts, for output, a DC voltage supplied from a chargeable and dischargeable storage battery into a desired voltage through switching operation of a switching element, the control method capable of controlling a voltage conversion ratio by adjusting a duty ratio of a switching control signal to be supplied to the switching element, comprising:
   detecting a voltage of the storage battery;
   acquiring information about a state of charge of the storage battery;
   changing an acceptable range of the voltage of the storage battery relative to variation in the state of charge of the storage battery; and
   limiting the duty ratio of the switching control signal such that the voltage of the storage battery falls in the acceptable range.

18. The control method for the voltage conversion apparatus according to claim 14, wherein
   the storage battery is a lithium ion secondary battery.

* * * * *

UNITED STATES PATENT AND TRADEMARK OFFICE
CERTIFICATE OF CORRECTION

PATENT NO. : 7,405,526 B2  Page 1 of 1
APPLICATION NO. : 11/783547
DATED : July 29, 2008
INVENTOR(S) : Eiji Sato It is certified that error appears in the above-identified patent and that said Letters Patent is hereby corrected as shown below:

| Column | Line | |
|---|---|---|
| 5 | 17 | Change "on exemplary" to --one exemplary--. |
| 8 | 7 | Change "wherein a" to --wherein α--. |
| 8 | 53 | Change "Vbo/2 Vc" to --Vbo/2Vc--. |
| 11 | 14 | Change "between Ibmax" to --between –Ibmax--. |
| 13 | 42 | After "which is" delete "a". |
| 13 | 45 | After "which is" delete "a". |
| 14 | 20 | Change "driving, system" to --driving system--. |
| 15 | 35 | Before "only" delete "an". |
| 15 | 60 | After "which is" delete "a". |
| 16 | 45 | After "such" delete "a". |
| 17 | 51 | After "resistance" insert --of--. |
| 19 | 1 | Change "T2 on" to --T2on--. |

Signed and Sealed this

Fifth Day of May, 2009

JOHN DOLL
*Acting Director of the United States Patent and Trademark Office*